United States Patent
Miyashita

(10) Patent No.: US 11,359,583 B2
(45) Date of Patent: Jun. 14, 2022

(54) EGR DEVICE

(71) Applicant: TOYOTA JIDOSHA KABUSHIKI KAISHA, Aichi-ken (JP)

(72) Inventor: Shigeki Miyashita, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/198,248

(22) Filed: Mar. 11, 2021

(65) Prior Publication Data

US 2021/0293206 A1 Sep. 23, 2021

(30) Foreign Application Priority Data

Mar. 18, 2020 (JP) .............................. JP2020-047199

(51) Int. Cl.
*F02M 26/20* (2016.01)

(52) U.S. Cl.
CPC .................. *F02M 26/20* (2016.02)

(58) Field of Classification Search
CPC .............................. F02M 26/20; F02M 26/19
See application file for complete search history.

(56) References Cited

U.S. PATENT DOCUMENTS

| | | | | |
|---|---|---|---|---|
| 11,008,983 B1 * | 5/2021 | Yoshioka | ............... | F02M 26/19 |
| 11,193,457 B2 * | 12/2021 | Yoshioka | ............... | F02M 26/19 |
| 2013/0306041 A1 * | 11/2013 | Koga | ..................... | F02M 26/44 |
| | | | | 123/568.11 |
| 2014/0014056 A1 * | 1/2014 | Sato | ........................ | F02M 26/41 |
| | | | | 123/184.47 |
| 2017/0226968 A1 * | 8/2017 | Nakamura | ............... | F02M 26/20 |
| 2018/0149120 A1 * | 5/2018 | Ito | .......................... | F02M 26/13 |
| 2020/0318559 A1 * | 10/2020 | Miyashita | ................. | F01L 1/34 |
| 2020/0408174 A1 * | 12/2020 | Sumi | ..................... | F02M 26/20 |
| 2021/0033050 A1 * | 2/2021 | Oda | ................. | F02M 35/10222 |

FOREIGN PATENT DOCUMENTS

JP 2017141675 A 8/2017

* cited by examiner

*Primary Examiner* — Xiao En Mo
(74) *Attorney, Agent, or Firm* — Hauptman Ham, LLP

(57) ABSTRACT

An EGR passage of an EGR device includes a plurality of EGR introduction passages and an EGR chamber. A plurality of cylinders include a first cylinder subset and a second cylinder subset, each of which is a pair of two cylinders positioned next to each other. An explosion interval between the two cylinders constituting the first cylinder subset is shorter than that of the second cylinder subset. A first total volume being the sum of volumes of two first EGR introduction passages associated with the first cylinder subset and a volume of a portion of the EGR chamber located between the two first EGR introduction passages is larger than a second total volume being the sum of volumes of two second EGR introduction passages associated with the second cylinder subset and a volume of a portion of the EGR chamber located between the two second EGR introduction passages.

8 Claims, 16 Drawing Sheets

Comparative Example 1

Comparative Example 2

First Embodiment

Modification Example

Comparative Example 3

Comparative Example 4

Explosion Order: #1 → #3 → #4 → #2

Volume: A>B; C>B
→Total Volume: At>Bt; Ct>Bt

Explosion Order: #1 → #8 → #7 → #3 → #6 → #5 → #4 → #2

Volume: B>A, C; D, E>F
→Total Volume: Bt>At, Ct; Dt, Et>Ft

Explosion Order: #1 → #8 → #4 → #3 → #6 → #5 → #7 → #2

Volume: C>B=E>A=D=F
→Total Volume: Ct>Bt=Et>At=Dt=Ft

EGR DEVICE

CROSS-REFERENCE TO RELATED APPICATION

The present disclosure claims priority under 35 U.S.C. § 119 to Japanese Patent Application No. 2020-047199, filed on Mar. 18, 2020. The content of which is incorporated herein by reference in its entirety.

BACKGROUND

Technical Field

The present disclosure relates to an EGR device, and more particularly to an EGR device configured to recirculate a part of exhaust gas of an internal combustion engine to an intake branch passage of each cylinder.

Background Art

JP 2017-141675 A discloses a gas distribution device for distributing EGR gas to each cylinder through an EGR chamber. The passage in this gas distribution device corresponds to a part of an EGR passage that connects an exhaust passage and an intake passage. Specifically, the gas distribution device includes a plurality of EGR introduction ports respectively connected to intake branch pipes respectively connected to a plurality of cylinders arranged in series, and an EGR chamber connected to the plurality of EGR introduction ports. The EGR chamber distributes EGR gas from the upstream to the plurality of EGR introduction ports. Furthermore, the gas distribution device is connected to the EGR chamber, and is provided with a branch passage portion (upstream-side gas distribution passage) that evenly distributes the gas introduced from a gas inlet and introduces it into the EGR chamber.

SUMMARY

Gas sucked into a cylinder may flow back from the cylinder to an EGR chamber through an EGR introduction port (EGR introduction passage) in the compression stroke. An EGR device mounted on an internal combustion engine having a plurality of cylinders arranged in series has the following problem. When two cylinders that are positioned next to each other in a plurality of cylinders are referred to as a "cylinder subset", in many internal combustion engines, the explosion interval between two cylinders that constitute a cylinder subset differs depending on the pair of the two cylinders that constitute the cylinder subset.

If the explosion interval between the two cylinders constituting the cylinder subset is different, the ease of re-suction of the gas flowing back into the EGR chamber from the EGR introduction passage of one of cylinders constituting the cylinder subset, into the EGR introduction passage of the other cylinder becomes different. This kind of difference in the ease of re-suction of the backflow gas (including fresh air) depending on the cylinder subset hinders the even distribution of the EGR gas to each cylinder. On the other hand, increasing the volume of the EGR chamber and the EGR introduction passage leads to an improvement in the distribution of EGR gas to each cylinder, but causes an increase in the size of the EGR chamber and the EGR introduction passage.

The present disclosure has been made in view of the problem described above, and an object of the present disclosure is to provide an EGR device that can improve the distribution of EGR gas between cylinders while reducing an increase in size of an EGR chamber and EGR introduction passages.

An EGR device according to the present disclosure is applied to an internal combustion engine including a plurality of cylinders arranged in series and a plurality of intake branch passages respectively connected to the plurality of cylinders, and is configured to recirculate a part of exhaust gas to the plurality of intake branch passages as EGR gas. The EGR device includes an EGR passage through which the EGR gas flows. The EGR passage includes: a plurality of EGR introduction passages respectively connected to the plurality of intake branch passages; and an EGR chamber connected to the plurality of EGR introduction passages and configured to distribute the EGR gas introduced into the EGR passage to the plurality of EGR introduction passages. The plurality of cylinders include a first cylinder subset being a pair of two cylinders that are positioned next to each other, and a second cylinder subset being another pair of two cylinders that are positioned next to each other. When comparing by a length of a shorter explosion interval of two explosion intervals between two cylinders belonging to a same cylinder subset, an explosion interval between the two cylinders constituting the first cylinder subset is shorter than an explosion interval between the two cylinders constituting the second cylinder subset. The plurality of EGR introduction passages include two first EGR introduction passages associated with the first cylinder subset and two second EGR introduction passages associated with the second cylinder subset. A first total volume being a sum of volumes of the two first EGR introduction passages and a volume of a portion of the EGR chamber located between the two first EGR introduction passages is larger than a second total volume being a sum of volumes of the two second EGR introduction passages and a volume of a portion of the EGR chamber located between the two second EGR introduction passages.

When a cylinder with an earlier explosion order in a shorter explosion interval of two explosion intervals between two cylinders belonging to a same cylinder subset is referred to as a preceding cylinder, one of the two first EGR introduction passages associated with the preceding cylinder belonging to the first cylinder subset may be formed such that a backflow gas from the one of the two first EGR introduction passages into the EGR chamber flows along a direction away from an inlet of another of the two first EGR introduction passages.

When a cylinder with an earlier explosion order in a shorter explosion interval of two explosion intervals between two cylinders belonging to a same cylinder subset is referred to as a preceding cylinder, the EGR chamber may include a guide portion configured to guide a backflow gas into the EGR chamber from one of the two first EGR introduction passages associated with the preceding cylinder belonging to the first cylinder subset such that the backflow gas flows along a direction away from an inlet of another of the two first EGR introduction passages.

The guide portion may be a guide plate arranged in the EGR chamber.

The guide portion may be a guide wall formed by using a shape of a passage wall surface of the EGR chamber.

According to the EGR device of the present disclosure, the EGR passage is configured such that the sum (the first total volume) of the volume of the portion of the EGR chamber associated with the first cylinder subset in which the explosion interval between the constituent cylinders is relatively short and the volumes of the two first EGR introduction passages is larger than the sum (the second total volume) of the volume of the portion of the EGR chamber associated with the second cylinder subset in which the explosion interval is relatively long and the volumes of the two second EGR introduction passages. According to the setting of the volume differences as just described, in the first cylinder subset in which backflow gas from one cylinder into the EGR chamber is easily re-sucked into another cylinder, the re-suction of the backflow gas can be reduced. That is, the distribution of EGR gas between cylinders in the first cylinder subset can be improved. Also, according to the setting, the second total volume for the second cylinder subset in which the re-suction of the backflow gas is less likely to occur is made relatively small. Therefore, according to the setting, it is possible to provide the EGR device that can improve the distribution of EGR gas between cylinders while reducing an increase in size of the EGR chamber and the EGR introduction passages.

DETAILED DESCRIPTION

Figure 1:
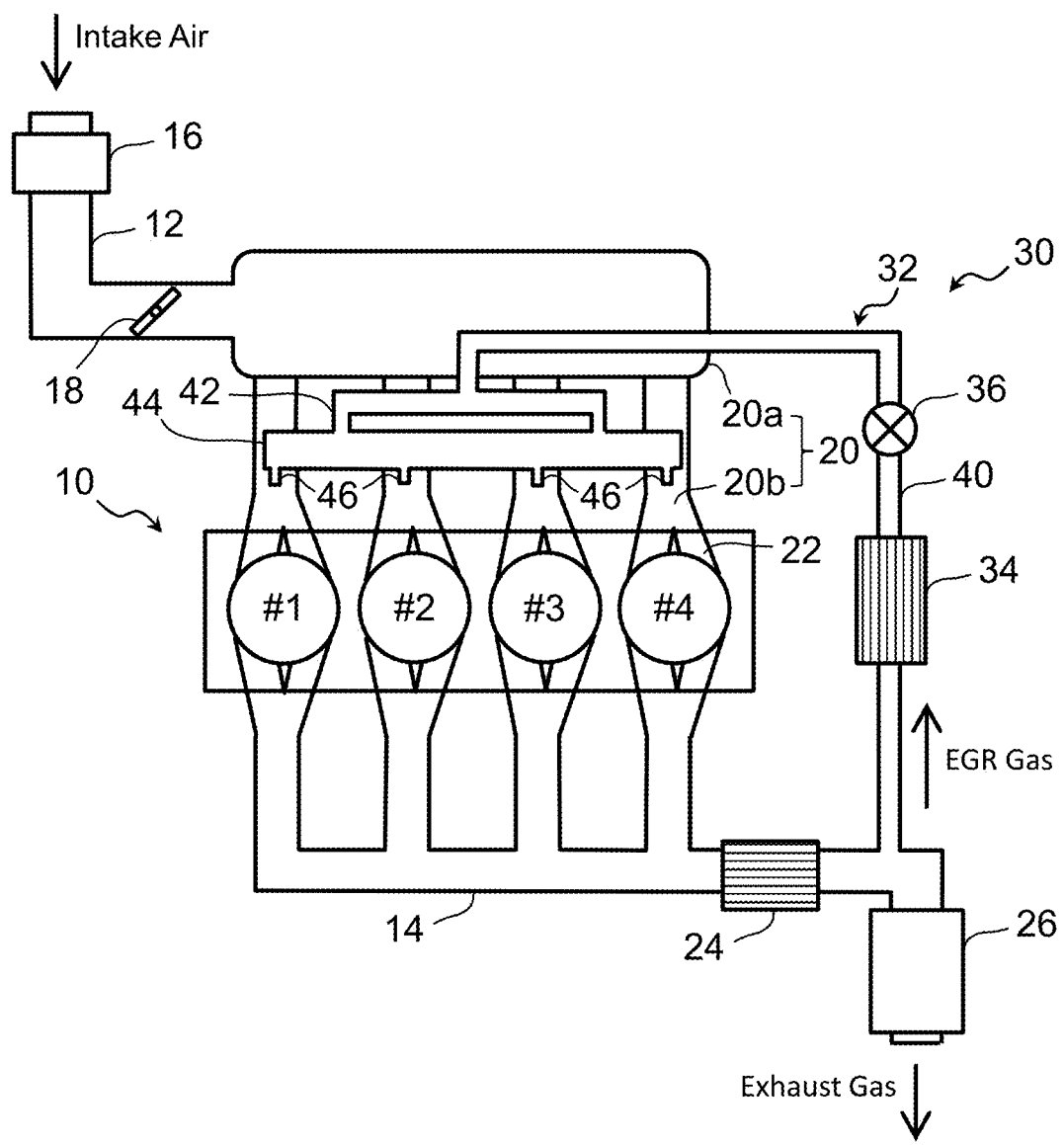
FIG. 1 is a schematic diagram showing an example of an overall configuration of an EGR device according to a first embodiment of the present disclosure.

In the following embodiments of the present disclosure, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or the like that are described in conjunction with the following embodiments are not necessarily essential to the present disclosure unless explicitly shown otherwise, or unless the present disclosure is explicitly specified by the structures or the like theoretically.

1. First Embodiment

A first embodiment according to the present disclosure will be described with reference to FIGS. 1 to 9.
1-1. Configuration of EGR Device
An internal combustion engine equipped with an "EGR device" according to the present disclosure is not particularly limited as long as it includes a "plurality of cylinders" satisfying the following conditions. The "plurality of cylinders" mentioned here are arranged in series. In an example of an in-line engine, all cylinders of an internal combustion engine typically correspond to the "plurality of cylinders". Moreover, in an example of a V-type engine, a plurality of cylinders arranged in series in each bank (i.e., a plurality of cylinders of a part of the internal combustion engine) correspond to the "plurality of cylinders". Then, the plurality of cylinders include a "first cylinder subset" which is a pair of two cylinders that are positioned next to each other, and a "second cylinder subset" which is another pair of two cylinders that are positioned next to each other.

Hereinafter, based on the length of the shorter explosion interval of two explosion intervals between two cylinders belonging to the same cylinder subset, the length of the explosion interval between the first cylinder subset and the second cylinder subset will be described. Specifically, it is assumed that, under this comparison criterion, the explosion interval between the two cylinders constituting the first cylinder subset is shorter than the explosion interval between the two cylinders constituting the second cylinder subset. Also, a cylinder with an earlier explosion order in the shorter explosion interval of the two explosion intervals between two cylinders belonging to the same cylinder subset is referred to as a "preceding cylinder". In the following description, it is assumed that "a cylinder with an earlier explosion order in a cylinder subset" refers to the preceding cylinder mentioned here.

It should be noted that the number of the first cylinder subset may be one or more depending on the number of cylinders and the cylinder arrangement of an internal combustion engine, and this also applies to the second cylinder subset. In addition, when comparing two cylinder subsets, whether a cylinder subset corresponds to the first cylinder subset or the second cylinder subset may differ depending on the length of the explosion interval between the cylinder subsets to be compared. For example, a cylinder subset A (e.g., a cylinder subset #4-#6 of examples shown in FIGS. 15 and 16, or a cylinder subset #3-#5 of examples shown in FIGS. 17 and 18 described below) may correspond to the first cylinder subset in comparison with a cylinder subset B, and may correspond to the second cylinder subset in comparison with a cylinder subset C.

1-1-1. Example of Overall Configuration of EGR Device

FIG. 1 is a schematic diagram showing an example of the overall configuration of an EGR device 30 according to the first embodiment of the present disclosure. In this example, the EGR device 30 is mounted on an in-line four-cylinder internal combustion engine 10 having four cylinders #1 to #4 arranged in series. These four cylinders (all cylinders) #1 to #4 correspond to an example of the "plurality of cylinders" according to the present disclosure. The internal combustion engine 10 includes an intake passage 12 and an exhaust passage 14 which communicate with the plurality of cylinders #1 to #4. It should be noted that the internal combustion engine 10 is a spark ignition engine, but may be a compression ignition engine.

An air cleaner 16, a throttle 18, and a surge tank 20a are arranged in the intake passage 12 in this order from the upstream side. The surge tank 20a corresponds to the collection portion of an intake manifold 20 that forms a part of the intake passage 12. The passage in the intake manifold 20 includes a plurality of intake branch passages 20b respectively connected to the plurality of cylinders #1 to #4 via the respective intake ports 22, together with the passage in the surge tank 20a.

An exhaust gas purifying catalyst 24 and a muffler 26 are arranged in the exhaust passage 14 in this order from the upstream side. The EGR device 30 includes an EGR passage 32 configured to connect the exhaust passage 14 and the intake passage 12. The EGR device 30 is configured to recirculate a part of exhaust gas to the intake passage 12 as EGR gas. An EGR cooler 34 and an EGR valve 36 are arranged in the EGR device 30 in this order from the upstream side of the EGR gas flow. The EGR valve 36 is configured to control the flow rate of the EGR gas that flows back from the EGR passage 32 to the intake passage 12.

The EGR passage 32 includes an upstream-side collecting passage 40, an upstream-side branch passage 42, an EGR chamber 44, and four EGR introduction passages 46. One end of the upstream-side collection passage 40 is connected to the exhaust passage 14, and the remaining end is connected to the upstream-side branch passage 42. The EGR cooler 34 and the EGR valve 36 described above are arranged in this upstream-side collecting passage 40. The upstream-side branch passage 42 is interposed between the upstream-side collecting passage 40 and the EGR chamber 44. The upstream-side branch passage 42 is bifurcated such that the EGR gas supplied to the inlet of the upstream-side branch passage 42 is distributed to the side of the cylinders #1 and #2 and the side of the cylinders #3 and #4.

The EGR chamber 44 is interposed between the upstream-side branch passage 42 and the four EGR introduction passages 56, and is formed to distribute the EGR gas supplied from the upstream-side branch passage 42 to the four EGR introduction passages 56. The four EGR introduction passages 46 are respectively connected to four intake branch passages 20b provided for the respective cylinders #1 to #4. It should be noted that each intake branch passage 20b which is a part of the intake manifold 20 corresponds to an example of the "intake branch passage" according to the present disclosure. Another example of the "intake branch passage" according to the present disclosure may be the intake port 22. That is, the four EGR introduction passages 56 may be respectively connected to the four intake ports 22 provided for the respective cylinders #1 to #4.

According to the EGR passage 32 configured as described above, the EGR gas introduced from the exhaust passage 14 by the upstream-side collecting passage 40 is distributed to the side of the cylinders #1 and #2 and the side of the cylinders #3 and #4 by the upstream-side branch passage 42. Thereafter, the EGR gas is distributed to the four intake branch passages 20b by the EGR chamber 44 and the four EGR introduction passages 46 and then individually sucked into each of the cylinders #1-#4.

1-1-2. Issues on EGR Device

Unlike the configuration including the EGR chamber 44 and four EGR introduction passages 46 described above, there is also a method of introducing EGR gas collectively into the surge tank 20a or a portion of the intake passage 12 on the upstream side of the surge tank 20a. However, when compared to this kind of method, the configuration in which an EGR introduction passage is arranged for each cylinder with respect to an intake branch passage located near the cylinder (combustion chamber) as in the EGR passage 32 is basically excellent in the controllability of the external EGR gas amount (more specifically, the responsiveness of an EGR gas amount control, and the distributivity of the EGR gas to each cylinder).

Then, in order to enable more even distribution of EGR gas to each cylinder in the configuration in which the EGR introduction passage is provided for each cylinder with respect to the intake branch passage as in the EGR passage 32, it is favorable to address both "issue A of improving the distributivity of EGR gas between cylinders (i.e., cylinder distribution)" and "issue B of minimizing the volume of an EGR chamber and a plurality of EGR introduction passages", as described in detail below.

1-1-2-1. Issue A on Improvement of Cylinder Distribution of EGR Gas

Figure 2:
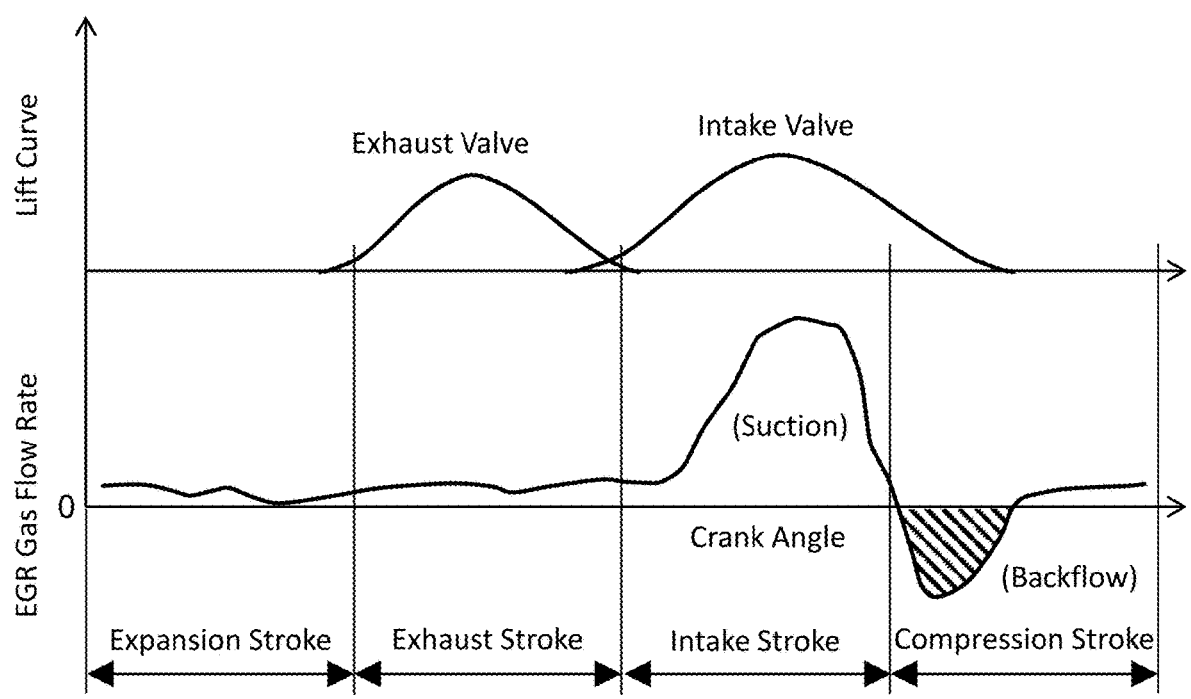
FIG. 2 is a diagram used to describe the backflow of gas from a cylinder to an EGR chamber.

FIG. 2 is a diagram used to describe the backflow of gas from the cylinder to the EGR chamber. FIG. 2 shows a lift curve of intake and exhaust valves in a cylinder and a change in EGR gas flow rate during one cycle. The EGR gas flow rate becomes positive when the EGR gas flows from the EGR chamber toward the cylinder, and conversely becomes negative when the EGR gas flows from the cylinder toward the EGR chamber.

The EGR gas is sucked into the cylinder in the intake stroke in which the intake valve is open and the piston descends. Because of this, as shown in FIG. 2, the EGR gas flow rate is increasing in the intake stroke. In addition, for the purpose of ensuring output performance in a high engine speed range and reducing abnormal combustion such as knocking, the closing timing of the intake valve is generally set from the initial stage to the middle stage of the compression stroke as shown in FIG. 2. Therefore, during a period in which the intake valve is open in the compression stroke, backflow of gas from the inside of the cylinder to the intake port occurs. Along with this, the pressure pulsation in the intake passage causes a backflow of gas into the EGR chamber near the cylinder (i.e., the EGR gas flow rate becomes negative as shown in FIG. 2).

Figure 3:
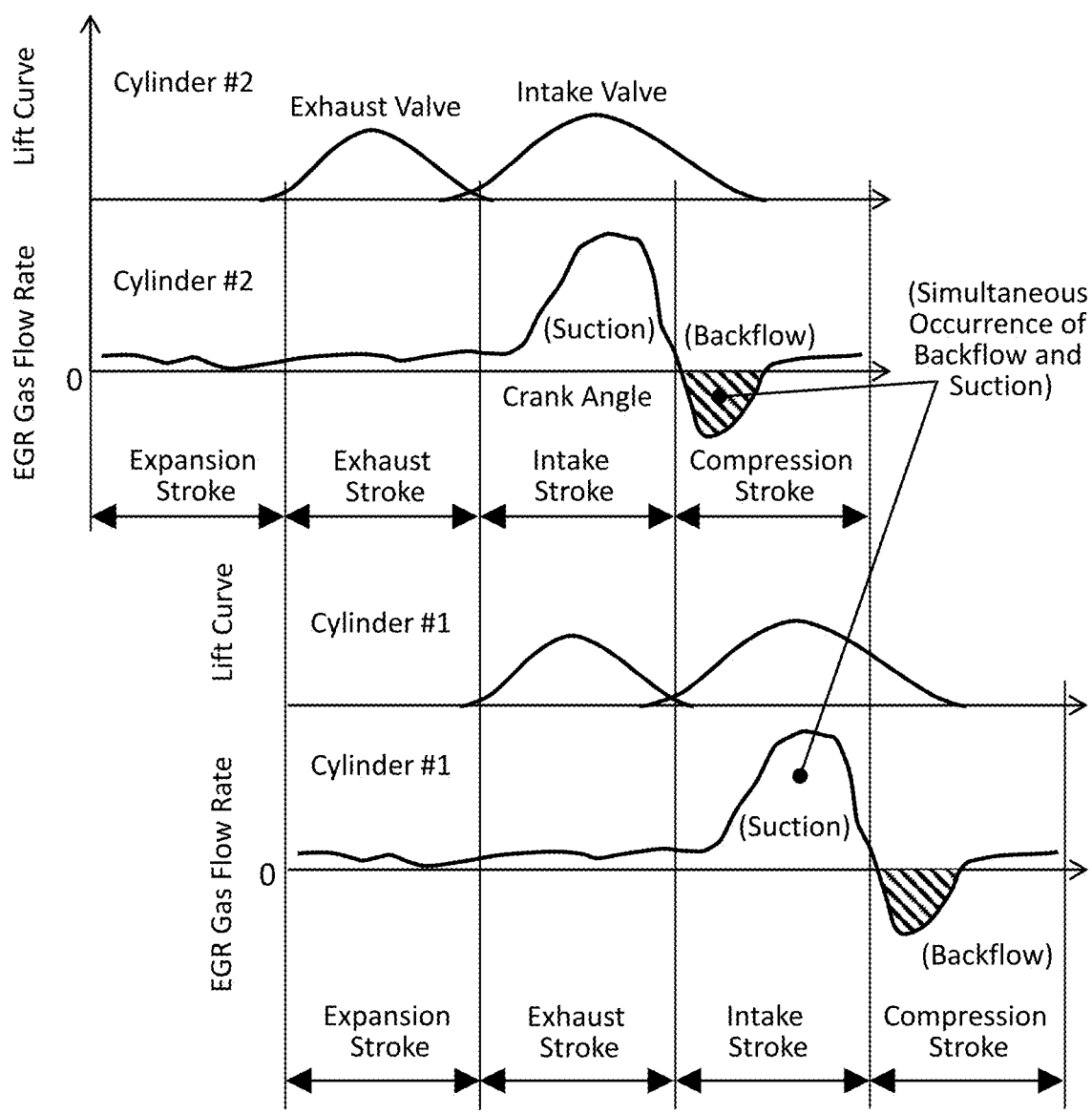
FIG. 3 is a diagram used to describe re-section of the gas flowing back into the EGR chamber into other cylinders.

FIG. 3 is a diagram used to describe re-section of the gas flowing back into the EGR chamber into other cylinders. FIG. 3 illustrates the cylinders #1 and #2 of an in-line four-cylinder engine as an example of a pair of two cylinders that are positioned next to each other and also have adjacent explosion orders. In the in-line four-cylinder engine, the explosion interval between cylinders is 180 degrees crank angle. Thus, when the cylinder #2 (preceding cylinder) with an earlier explosion order is in the compression stroke, the cylinder #1 with the next explosion order is in the intake stroke. Therefore, as shown in FIG. 3, in the two adjacent cylinders #1 and #2, the backflow of EGR gas into the EGR chamber and the suction of EGR gas from the EGR chamber occur at the same time. The gas that has flowed back into the EGR chamber from the cylinder #2 in the compression stroke contains fresh air. More specifically, in the example of the spark ignition type internal combustion engine 10, the gas is an air-fuel mixture. When this kind of backflow gas is sucked again from the EGR chamber into the cylinder #1, the amount of EGR gas introduced into the cylinder #1 becomes smaller than that of the cylinder #2.

Therefore, more specifically, the issue A on the improvement of the cylinder distribution of the EGR gas includes "an issue A1 of preventing the gas (including fresh air) flowing back into the EGR chamber from the intake passage due to the pressure pulsation from being re-sucked (distributed) to other cylinders". In addition, in order to improve the cylinder distribution, it is favorable to "equalize the passage pressure loss of the EGR passage 32 between cylinders". Therefore, the issue A may also include "an issue A2 of equalizing the passage pressure loss between the cylinders".

Figure 4A:
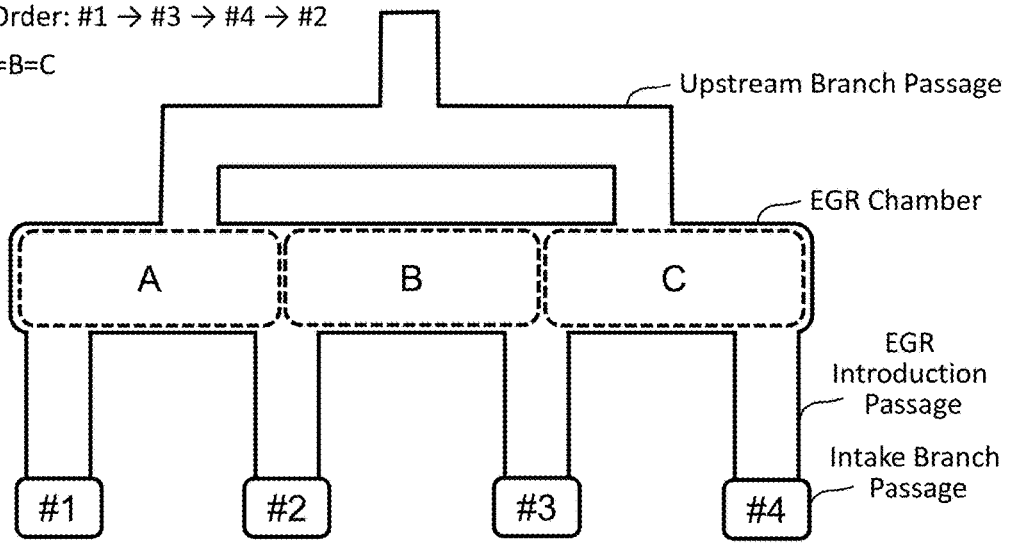
FIGS. 4A and 4B are schematic diagrams showing configuration of an EGR chamber and EGR introduction passages in comparative examples 1 and 2 referred to in the first embodiment of the present disclosure, respectively.
Figure 4B:
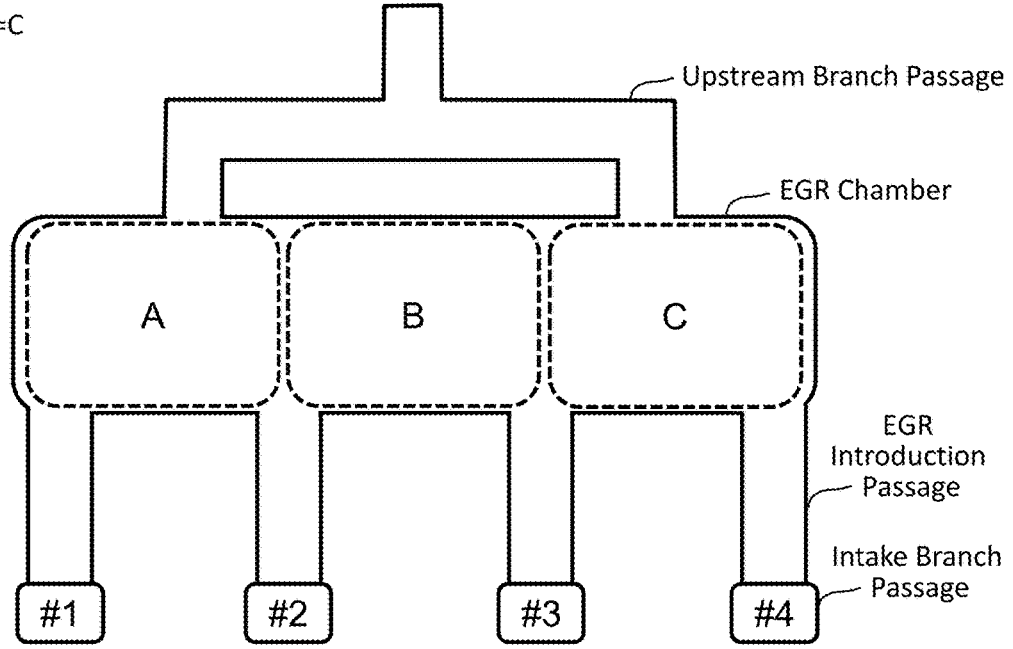

Then, FIGS. 4A and 4B are schematic diagrams showing the configuration of the EGR chamber and the EGR introduction passages in comparative examples 1 and 2 referred to in the first embodiment of the present disclosure, respectively. As a premise, it is assumed that the EGR gas evenly distributed by the upstream-side branch passage is introduced into a gas inlet of each of EGR chambers shown in FIGS. 4A and 4B, by using a method shown in FIG. 7A described below. In addition, it is assumed that the explosion order of the in-line four-cylinder engine in the comparative examples 1 and 2 is #1→#3→#4→#2.

In the comparative examples 1 and 2, the volume of a portion of the EGR chamber between the cylinders #1 and #2 positioned next to each other is referred to as "volume A", the volume of a portion of the EGR chamber between the cylinders #2 and #3 positioned next to each other is referred to as "volume B", and the volume of a portion of the EGR chamber between the cylinders #3 and #4 positioned next to each other is referred to as "volume A". In the comparative examples 1 and 2, the volumes A to C are evenly secured. In addition, in the comparative example 2, each of the volumes A to C is largely secured as compared with the comparative example 1.

Figure 5A:
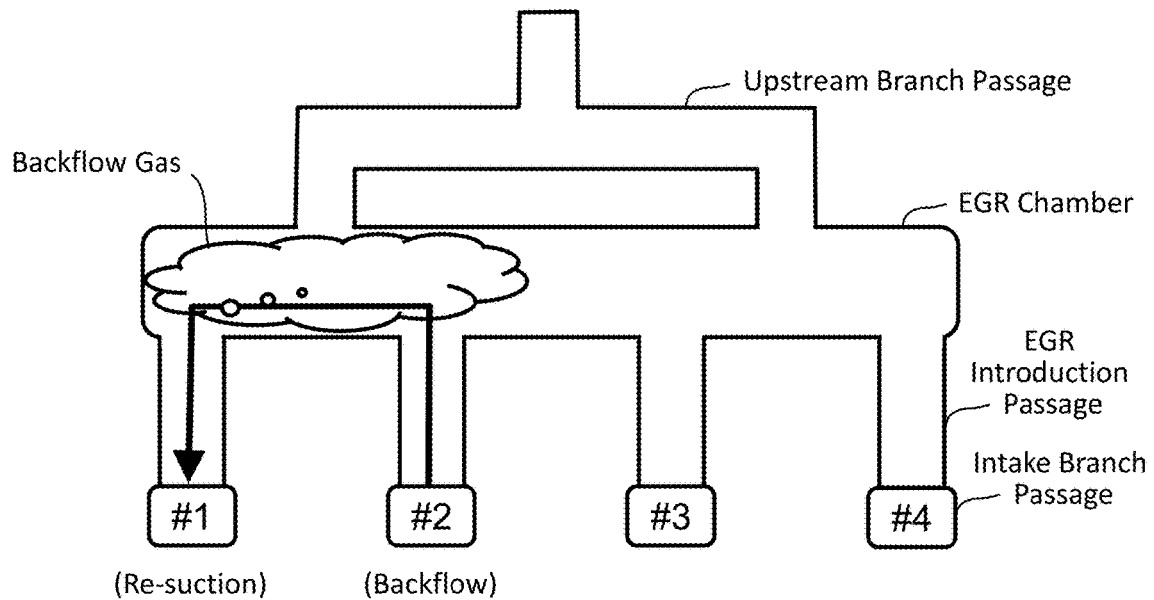
FIGS. 5A and 5B are schematic diagrams used to describe the cylinder distribution of EGR gas in the comparative examples 1 and 2 shown in FIGS. 4A and 4B, respectively.
Figure 5B:
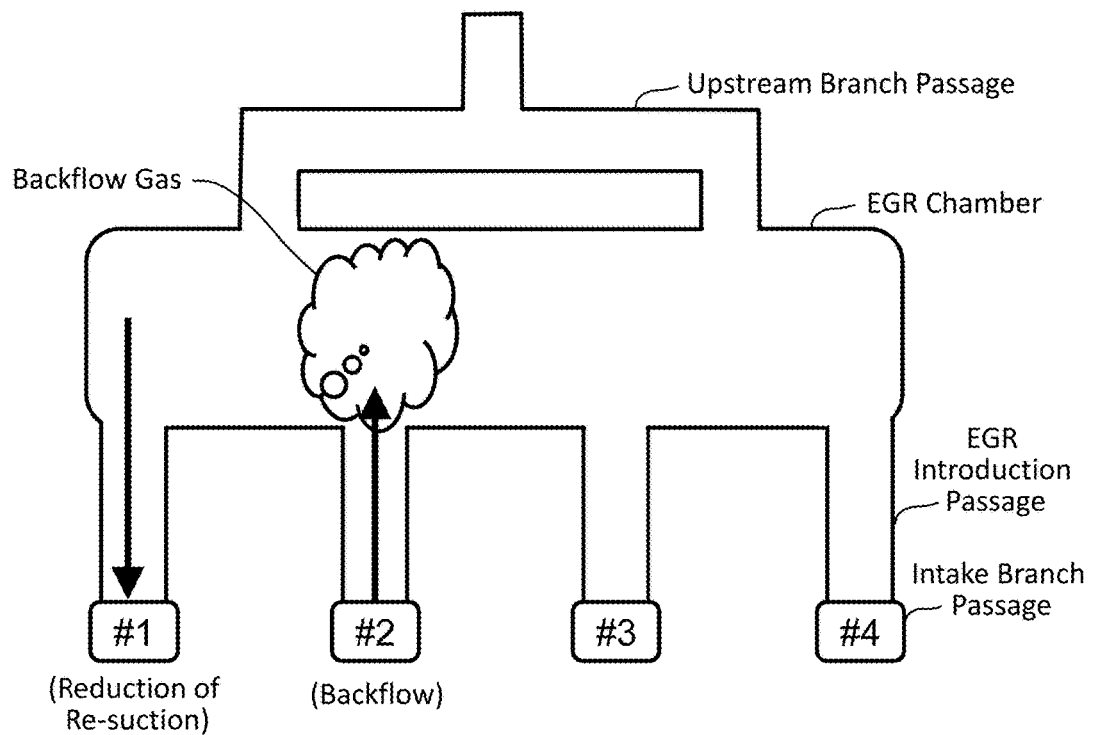

FIGS. 5A and 5B are schematic diagrams used to describe the cylinder distribution of EGR gas in the comparative examples 1 and 2 shown in FIGS. 4A and 4B, respectively. Here, the cylinders #1 and #2 will be described as an example.

First, in the comparative example 1 in which the volumes A to C of each part of the EGR chamber are relatively small, the gas (including fresh air) flowing back from the cylinder #2 into the EGR chamber is easy to immediately reaches the inlet of the EGR introduction passage of the next cylinder #1 in the explosion order. Therefore, as shown in FIG. 5A, the backflow gas is easy to be re-sucked into the cylinder #1. As a result, the amount of EGR gas supplied to the cylinder #1 is reduced by the amount according to the re-suction of the backflow gas from another cylinders #2.

On the other hand, where the explosion order of two cylinders is apart even if the two cylinders are positioned next to each other as in the cylinder #3 with respect to the cylinder #2, the gas that has flown back into the EGR chamber from the cylinder #2 is re-sucked into the cylinder #2 itself or is easily diffused into the EGR chamber. Therefore, the re-suction of the backflow gas into the adjacent cylinder (here, the cylinder #3) is reduced. That is, a decrease in the amount of EGR gas supplied to the cylinder #3 due to re-suction of the backflow gas from another cylinder #2 is reduced.

As described above, even if a cylinder B is positioned next to a cylinder A, the amount of re-suction of the backflow gas into the cylinder B will differs depending on the length of explosion interval with respect to the cylinder A. This leads to the generation of a difference between cylinders in the amount of EGR gas supplied to each cylinder.

Then, in the comparative example 2 in which the volumes A to C of each part of the EGR chamber are relatively large, even if the cylinder #1 with the next explosion order is adjacent to the cylinder #2, the gas that has flown back into the EGR chamber from the cylinder #2 is less likely to be re-suctioned as shown in FIG. 5B. More specifically, if the EGR chamber volume between adjacent cylinders (in FIG. 5B, the volume A) is secured to be larger than the volume of the backflow gas, re-suction can be effectively reduced.

1-1-2-2. Summary

As can be seen from the explanation given with reference to the comparative examples 1 and 2, it is effective to secure a large volume of the EGR chamber between adjacent cylinders in order to address the issue A1 (reduction of re-suction of the backflow gas into other cylinders). It is also effective to secure a large volume of the EGR introduction passages between adjacent cylinders. However, in order to increase these volumes, securing the mounting space for the EGR chamber and the EGR introduction passages becomes a new issue C1. Furthermore, a new issue C2 arises in which the amount of heat released at low outside temperatures increases due to an increase in surface area associated with an increase in these volumes, and as a result, the amount of dew condensation of EGR gas on the inner walls of the EGR chamber and the EGR introduction passages increases.

Therefore, it is required to address the issue A1 on the cylinder distribution (reduction of re-suction of the backflow gas into another cylinder) while addressing the issue B of minimizing the volumes of the EGR chamber and the plurality of EGR introduction passages in order to cope with the above described new issues C1 and C2. Furthermore, in order to improve the cylinder distribution, it is more favorable to address not only the issue A1 but also the issue A2 (equalizing the passage pressure loss between among the cylinders).

In addition, the configuration of the comparative example 1 is excellent for the issue B because the volume of the EGR chamber is small, but is inferior in the cylinder distribution of the issue A1. On the other hand, the configuration of the comparative example 2 is excellent in the cylinder distribution, but does not address the issue B.

1-1-3. Specific Configuration of EGR Passage According to First Embodiment

1-1-3-1. Setting of Volume

Figure 6:
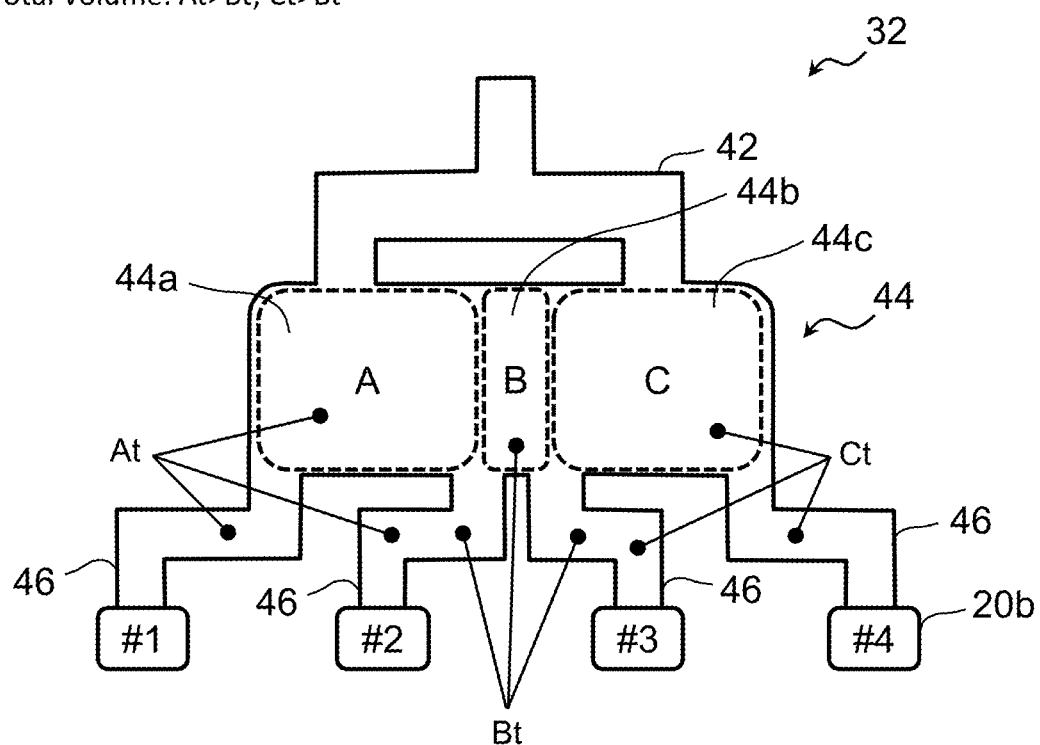
FIG. 6 is a schematic diagram showing a specific configuration of an EGR chamber and EGR introduction passages according to the first embodiment of the present disclosure.

FIG. 6 is a schematic diagram showing a specific configuration of the EGR chamber 44 and the EGR introduction passages 56 according to the first embodiment of the present disclosure. Hereinafter, a pair of two cylinders #A and #B that are positioned next to each other is also simply referred to as a "cylinder subset #A-#B".

A cylinder subset #1-#2, a cylinder subset #2-#3, and a cylinder subset #3-#4 correspond to pairs of two cylinders positioned next to each other in the in-line four-cylinder internal combustion engine 10. An example of the order of explosions of the internal combustion engine 10 is #1→#3→#4→#2, which is typical of an in-line four-cylinder engine, similarly to the comparative examples 1 and 2 described above.

Of the three cylinder subsets described above, one or more cylinder subsets in which the explosion orders are adjacent to each other between the constituent cylinders are the cylinder subsets #1-#2 and the cylinder subsets #3-#4. The explosion interval between two cylinders #2 and #3 constituting the remaining cylinder subsets #2-#3 are longer than those of the cylinder subsets #1-#2 and #3-#4. Therefore, in the example of the internal combustion engine 10, the cylinder subsets #1-#2 and #3-#4 each correspond to an example of the "first cylinder subset" according to the present disclosure, and the cylinder subset #2-#3 corresponds to an example of the "second cylinder subset" according to the present disclosure.

The EGR chamber 44 has chamber portions 44a, 44b, and 44c as portions between cylinders. The chamber portion 44a corresponds to the portion of the EGR chamber 44 located between the intake branch passages 20b of two cylinders #1 and #2 constituting the cylinder subset #1 to #2. Similarly, the chamber portions 44b and 44c correspond to the cylinder subsets #2-#3 and #3-#4, respectively.

The EGR chamber 44 is formed such that the volume A of the chamber portion 44a associated with the first cylinder subset #1-#2 in which the explosion interval between the constituent cylinders is relatively short is larger than the volume B of the chamber portion 44b associated with the second cylinder subset #2-#3 in which it is relatively long, as shown in FIG. 6. Similarly, the EGR chamber 44 is formed such that the volume C of the chamber portion 44c is larger than the volume B.

To be more specific, according to the present embodiment, each of the volumes A and C of the EGR chamber 44 is preset to be larger than the volume of gas flowing back from the cylinder to the EGR chamber 44 in the compression stroke, as an example. According to this kind of setting, even if the explosion interval between two adjacent cylinders is short, it is possible to effectively reduce the re-suction of the backflow gas to one or more adjacent cylinders.

Then, in the EGR passage 32 according to the present embodiment, the volumes of the EGR introduction passages 46 associated with the respective cylinders #1 to #4 are equal to each other. Therefore, with the above described setting of the volumes A to C of the chamber portions 44a to 44c, a similar volume difference to the difference between the volumes A to C is also set, between the cylinder subsets, regarding "total volumes At to Ct" which are the sum of the volumes A to C of the chamber portions 44a to 44c and the volumes of the EGR introduction passages 46 associated therewith. It should be noted that, in the example of the EGR passage 32, the total volumes At and Ct correspond to an example of the "first total volume" according to the present disclosure, and the total volume Bt corresponds to an example of the "second total volume" according to the present disclosure.

(Handling of EGR Introduction Passages for Calculation of Total Volumes At to Ct)

The EGR introduction passage 46 of the cylinder #1 directly communicates only with the chamber portion 44a, and the EGR introduction passage 46 of the cylinder #4 directly communicates only with the chamber portion 44c. In contrast, the EGR introduction passage 46 of the cylinder #2 directly communicates with both the chamber portions 44a and 44b, and the EGR introduction passage 46 of the cylinder #3 directly communicates with both the chamber portions 44b and 44c. Regarding the calculation of the "total volumes At to Ct" associated with the respective cylinder subsets, the EGR introduction passages 46 of cylinders #2 and #3 are regarded as follows.

That is, in the calculation of the total volume At associated with the first cylinder subset #1-#2, the volume of the EGR introduction passage 46 (which corresponds to the "first EGR introduction passage") of the cylinder #2 is added to the volume A and the volume of the EGR introduction passage 46 (which corresponds to the "first EGR introduction passage") of the cylinder #1. Also, in the calculation of the total volume Bt associated with the second cylinder subset #2-#3, the individual volumes of the EGR introduction passages 46 (both of which correspond to the "second EGR introduction passage") of the cylinders #2 and #3 are added to the volume B. Furthermore, in the calculation of the total volume Ct associated with the first cylinder subset #3-#4, the volume of the EGR introduction passage 46 (which corresponds to the "first EGR introduction passage") of the cylinder #3 is added to the volume C and the volume of the EGR introduction passage 46 (which corresponds to the "first EGR introduction passage") of the cylinder #4. This kind of handling also applies to other second to seventh embodiments.

1-1-3-2. Measures for Issue A2 (Equalization of Passage Pressure Loss Between Cylinders)

Figure 7A:
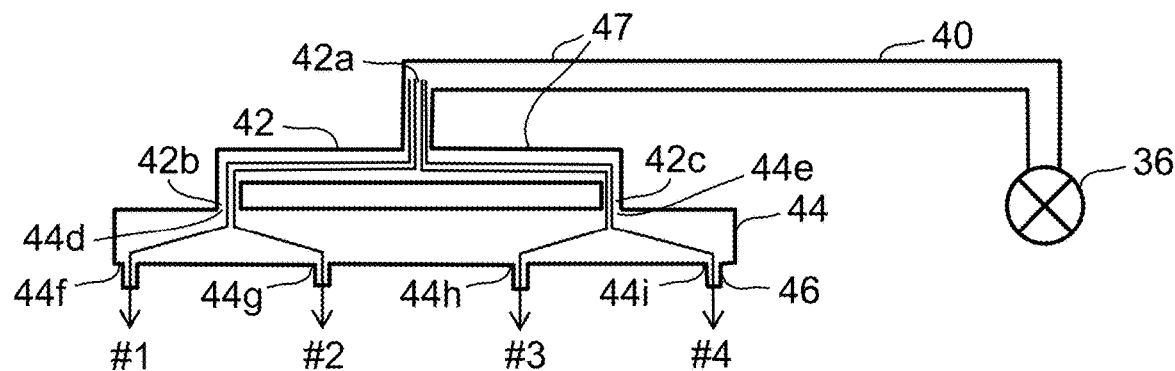
FIGS. 7A and 7B are schematic diagrams used to describe measures for an issue A2 in the first embodiment of the present disclosure and a modification example thereof, respectively.
Figure 7B:
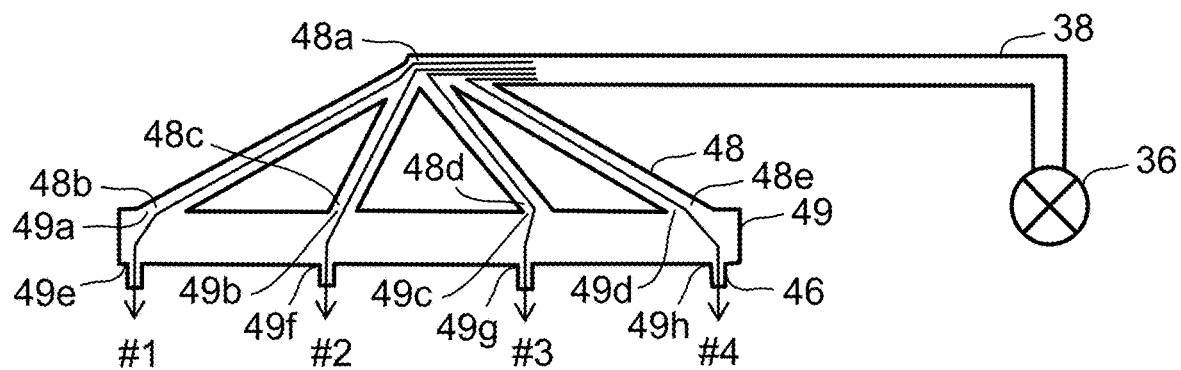
Figure 8A:
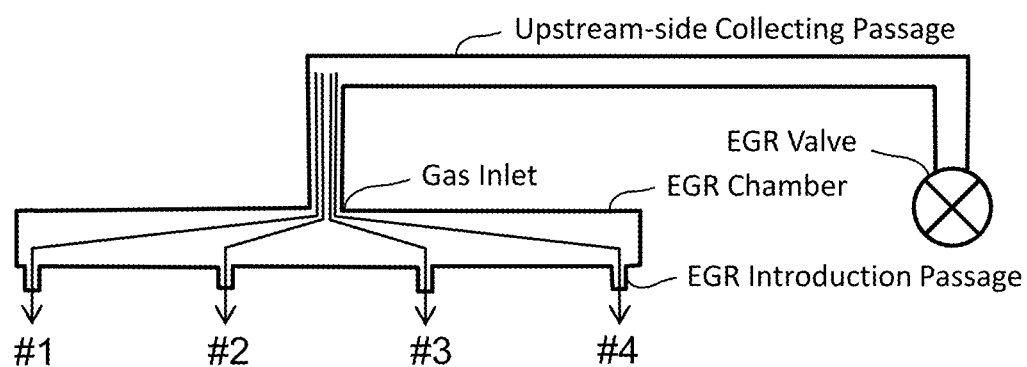
FIGS. 8A and 8B are schematic diagrams illustrating configuration of comparative examples 3 and 4 having no measures for the issue A2, respectively.
Figure 8B:
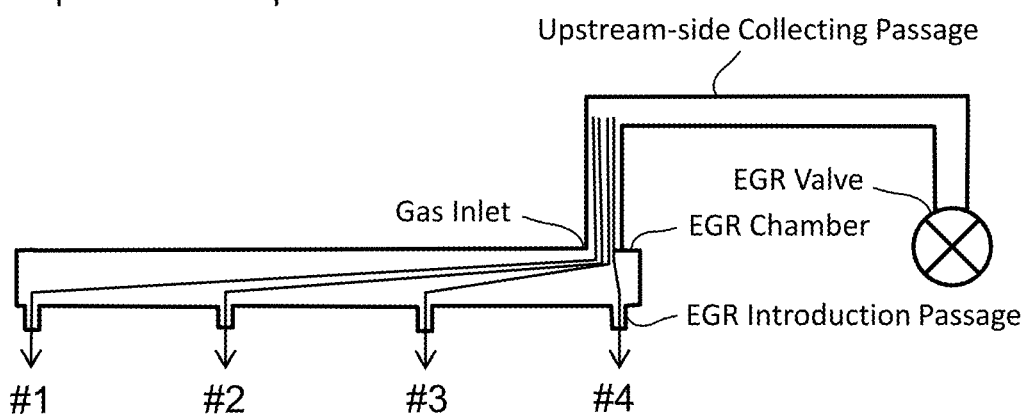

FIGS. 7A and 7B are schematic diagrams used to describe measures for the issue A2 in the first embodiment of the present disclosure and a modification example thereof, respectively. FIGS. 8A and 8B are schematic diagrams illustrating the configuration of comparative examples 3 and 4 having no measures for the issue A2, respectively.

The portion of an EGR passage located between an EGR valve and an EGR chamber is herein referred to as an "EGR chamber upstream portion". In the EGR passage 32 according to the present embodiment, as shown in FIG. 7A, the combination of the portion of the upstream-side collecting passage 40 located on the downstream side of the EGR valve 36 and the upstream-side branch passage 42 corresponds to the EGR chamber upstream portion 47.

In view of the issue A2 described above, according to the EGR passage 32 of the present embodiment, measures are taken as follows to make the passage pressure loss from the position of the EGR valve 36 to each outlet of the four EGR introduction passages 46 as equal as possible in each of the cylinders #1 to #4 (the plurality of cylinders). More specifically, the passage pressure loss is determined based on the passage diameter and the passage length, and becomes greater when the passage diameter is smaller and also becomes greater when the passage length is greater. In the EGR passage 32, as an example, the passage diameter is constant in each of the EGR chamber upstream portion 47, the EGR chamber 44, and the four EGR introduction passages 46 (this also applies to FIGS. 7B, 8A, and 8B). Then, the EGR passage 32 is configured such that the passage pressure loss is equal for each cylinder by the setting of the passage length of each of these passages.

Specifically, the upstream-side branch passage 42 is formed such that the passage length from a gas inlet 42a to a gas outlet 42b on the side of the cylinders #1 and #2 is equal to the passage length from the gas inlet 42a to a gas outlet 42c on the side of the cylinders #3 and #4. Also, a gas inlet on the side of the cylinders #1 and #2 and a gas inlet on the side of cylinders #3 and #4 in the EGR chamber 44 are referred to as gas inlets 44d and 44e, respectively, and gas outlets on the cylinders #1 to #4 sides are referred to as gas outlets 44f to 44i, respectively. The positions of these gas inlets 44d and 44e and gas outlets 44f-44i are set such that the passage lengths from the gas inlet 44d to each gas outlet 44f, 44g and the passage lengths from the gas inlet 44e to each gas outlet 44h, 44i are all equal.

Moreover, the measures for the issue A2 may be taken by, for example, the modification example shown in FIG. 7B, instead of the configuration example shown in FIG. 7A. In the modification example shown in FIG. 7B, an upstream-side branch passage 48 interposed between the upstream-side collecting passage 40 and the EGR chamber 44 is configured as an equally long passage that branches individually from a gas inlet 48a toward gas outlets 48b to 48e on the respective cylinders #1 to #4 sides. Furthermore, gas inlets associated with the respective cylinders #1 to #4 in the EGR chamber 49 are referred to as gas inlets 49a to 49d, and gas outlets associated with the respective cylinders #1 to #4 are referred to as gas outlets 49e to 49h. These gas inlets 49a to 49d and gas outlets 49e to 49h are set such that the passage lengths from the gas inlets 49a to 49d to the gas outlets 49e to 49h for the respective cylinders #1 to #4 are equal to each other.

In addition, the measures for the issue A2 may be taken by adjusting both the passage diameter and the passage length, instead of making the passage length uniform between cylinders while keeping the passage diameter constant as in the example described above.

On the other hand, in the comparative examples 3 and 4 shown in FIGS. 8A and 8B, the upstream-side branch passage is not provided. Then, in the comparative example 3, the EGR gas is introduced into the EGR chamber from a gas inlet provided at the center position in the row direction of the cylinders #1 to #4. Because of this, as shown in FIG. 8A, the passage lengths from the EGR valve to gas outlets of the respective EGR introduction passages are not uniform between the cylinders #1 to #4, and therefore, the passage pressure loss cannot be equalized for each cylinder. Furthermore, in the comparative example 4, the EGR gas is introduced into the EGR chamber from a gas inlet provided at one end of the cylinders #1 to #4 in the row direction. Therefore, even in the comparative example 4, as shown in FIG. 8B, the passage lengths are not uniform between the cylinders #1 to #4, and therefore, the passage pressure loss cannot be equalized for each cylinder. As described above, the configurations of the comparative examples 3 and 4 do not correspond to the measures for the issue A2.

1-2. Effect

Figure 9:
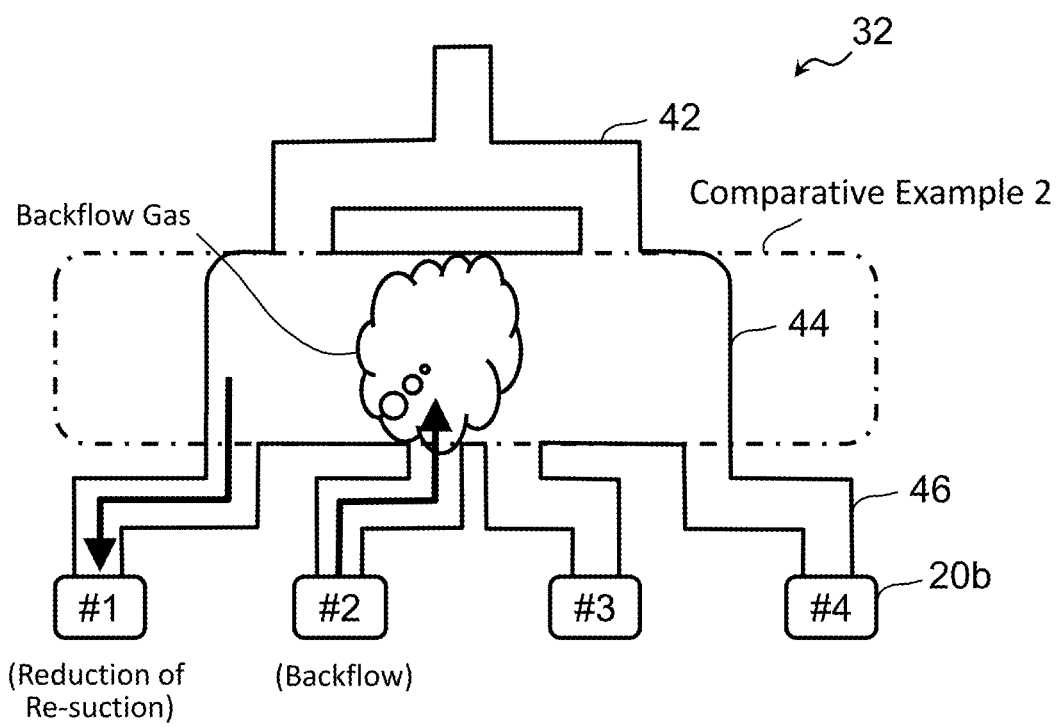
FIG. 9 is a schematic diagram used to describe the effect of the configuration of an EGR passage according to the first embodiment of the present disclosure.

FIG. 9 is a schematic diagram used to describe the effect of the configuration of the EGR passage 32 according to the first embodiment of the present disclosure. The EGR passage 32 according to the present embodiment is formed such that, with the setting of the volumes A to C of the respective portions of the EGR chamber 44, the "first total volume At" for the first cylinder subset #1-#2 with a relatively short explosion interval between the constituent cylinders is larger than the "second total volume Bt" for the second cylinder subset #2-#3 with a relatively long explosion interval. Similarly, the EGR passage 32 is formed such that the "first total volume Ct" for the first cylinder subset #3-#4 is larger than the "second total volume Bt".

According to the configuration described above, by increasing the "first total volumes At and Ct" in the first cylinder subsets #1-#2 and #3-#4 in which the explosion interval is relatively short, the re-suction of the backflow gas from one cylinder #2 into another cylinder #1 can be reduced as illustrated in FIG. 9 (i.e., the issue A1 can be addressed). Also, in the second cylinder subset #2-#3 in which the explosion interval is relatively long, even if the "second total volume Bt" is reduced, the backflow gas from one cylinder #2 (or #3) is easily re-sucked into the cylinder #2 (or #3) itself or is easily diffused into the EGR chamber 44, so that it is difficult to re-suck a large amount of the backflow gas into another other cylinder #3 (or #2). Then, by reducing the second total volume Bt, the total volume of the EGR chamber 44 and the four EGR introduction passages 46 can be reduced to the minimum necessary (i.e., the issue B can be addressed). In addition, in the example of the EGR passage 32, as shown in FIG. 9, the volume of the entire EGR chamber 44 can be reduced as compared to that in the comparative example 2 (see one-dot chain line). In other words, according to the EGR passage 32 of the present embodiment, by providing the volume difference between the cylinder subsets in consideration of the ease of re-suction of the backflow gas to the adjacent cylinder, the overall volume of the EGR chamber 44 and the four EGR introduction passages 46 can be reduced.

As described so far, according to the EGR device 30 including the EGR passage 32 according to the present embodiment, both the issue A1 and the issue B can be addressed. That is, the distribution of EGR gas to the individual cylinders #1 to #4 can be improved while reducing an increase in size of the EGR chamber 44 and the EGR introduction passages 46.

Furthermore, as shown in FIG. 7A, the EGR passage 32 is configured such that the respective passage pressure losses of the EGR chamber upstream portion 47, the EGR chamber 44, and the four EGR introduction passages 46 become as even as possible for each cylinder. As a result, since the issue A2 can also be addressed in addition to the issue A1, the cylinder distributivity of the EGR gas can be more effectively improved.

2. Second Embodiment

Figure 10:
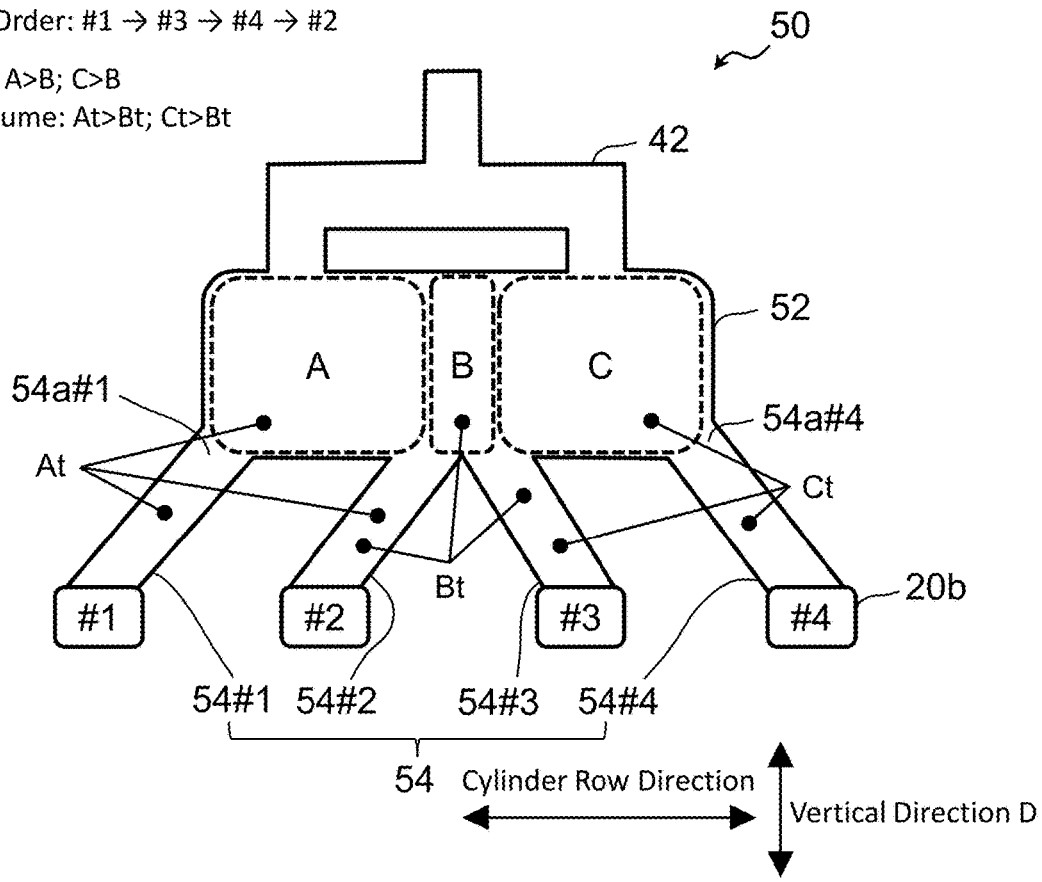
FIG. 10 is a schematic diagram showing a configuration of an EGR passage according to a second embodiment of the present disclosure.

Then, a second embodiment according to the present disclosure will be described with reference to FIGS. 10 and 11. FIG. 10 is a schematic diagram showing a configuration of an EGR passage 50 according to the second embodiment of the present disclosure. The EGR passage 50 included in an EGR device according to the present embodiment is different from the EGR passage 32 according to the first embodiment in that an EGR chamber 52 and EGR introduction passages 54 are provided in place of the EGR chamber 44 and the EGR introduction passages 46.

In the first embodiment described above, the volumes A and C of the chamber portions 44a and 44c are appropriately secured such that the gas that has flown back into the EGR chamber 44 is not re-sucked into the adjacent cylinder for the first cylinder subsets #1-#2 and #3-#4 in which the explosion interval between the constituent cylinders is short.

Here, if the gas that has flown back into the EGR chamber from a cylinder (for example, cylinder #2) can be moved in a direction away from the inlet of the EGR introduction passage of the adjacent cylinder (for example, the cylinder #1) (in other words, if the gas can be prevented from flowing toward to the side of the aforementioned inlet), re-suction to the adjacent cylinder can be reduced, so that the volumes A and C necessary for reducing the re-intake can be reduced (additional issue D). This leads to a further reduction in the volume of the entire EGR chamber (more specifically, the overall volume of the EGR chamber and the four EGR introduction passages).

In view of the additional issue D described above, in the EGR passage 50 according to the second embodiment, the shapes of the EGR introduction passages 54#2 and 54#3 of the cylinders (preceding cylinders) #2 and #3 with the earlier explosion order among the first cylinder subsets #1-#2 and #3-#4 are set as follows.

That is, the EGR introduction passage 46 according to the first embodiment has a bent shape, and its gas inlet faces a direction D (see FIG. 10) perpendicular to the row direction of the cylinders #1 to #4. In contrast, according to the EGR passage 50, the EGR introduction passage 54#2 of the cylinder #2 with an earlier explosion order among the first cylinder subset #1-#2 is formed such that the backflow gas into the EGR chamber 52 from the EGR introduction passage 54#2 corresponding to one of two first EGR introduction passages flows along a direction away from an inlet 54a#1 of the EGR introduction passage 54#1 corresponding to the other of the two first EGR introduction passages. Similarly, the EGR introduction passage 54#3 of the cylinder #3 with an earlier explosion order among the other first cylinder subset #3-#4 is formed such that the backflow gas into the EGR chamber 52 from the EGR introduction passage 54#3 corresponding to one of two first EGR introduction passages flows along a direction away from an inlet 54a#4 of the EGR introduction passage 54#4 corresponding to the other of the two first EGR introduction passages.

In addition, as an example, each of the EGR introduction passages 54#2 and 54#3 has a straight shape inclined with respect to the direction D perpendicular to the row direction of the cylinders #1 to #4. Also, in the example shown in FIG. 10, in order to make the passage pressure loss more even between the cylinders as compared with the first embodiment by making the passage lengths of the four EGR introduction passages 54 the same, not only the EGR introduction passages 54#2 and 54#3 corresponding to the "first EGR introduction passage" but also the remaining EGR introduction passages 54#1 and 54#4 have a similarly inclined straight shape. However, the EGR introduction passages 54#1 and 54#4 may not necessarily have the shape described above.

Figure 11:
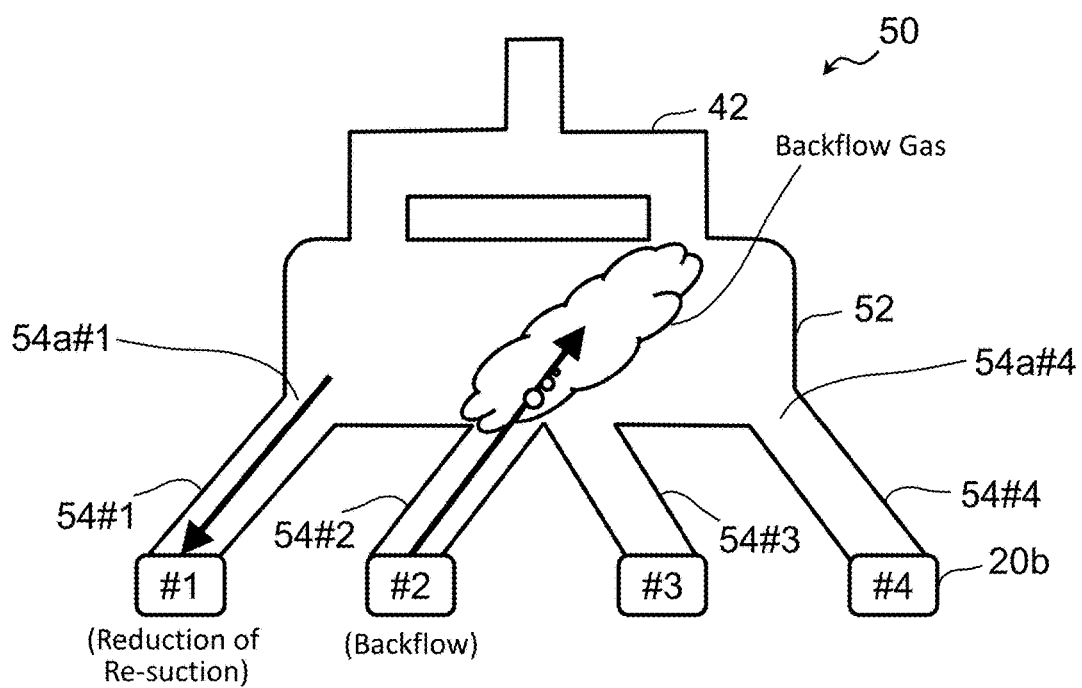
FIG. 11 is a schematic diagram used to describe the effect of configuration of the EGR passage according to the second embodiment of the present disclosure.

FIG. 11 is a schematic diagram used to describe the effect of the configuration of the EGR passage 50 according to the second embodiment of the present disclosure. According to the EGR passage 50 including the EGR introduction passage (first EGR introduction passage) 54#2 whose orientation is set as described above, as illustrated in FIG. 11, the backflow gas from one EGR introduction passage 54#2 of the first cylinder subset #1-#2 can be moved so as to flow along a direction away from the inlet 54a#1 of the other EGR introduction passage 54#1. This makes it possible to reduce the re-suction of the backflow gas into the adjacent cylinder #1, and thus to reduce the volume A necessary for reducing the re-suction. This also applies to the other first cylinder subset #3-#4, and the volume C necessary for reducing the re-suction can be reduced. Then, with the reduction of the volumes A and C, the volume of the entire EGR chamber 52 (more specifically, the overall volume of the EGR chamber 52 and the four EGR introduction passages 54) can be further reduced.

As described so far, according to the EGR device including the EGR passage 50 according to the second embodiment, the additional issue D can be addressed together with the issue A1 and the issue B.

3. Third Embodiment

Figure 12:
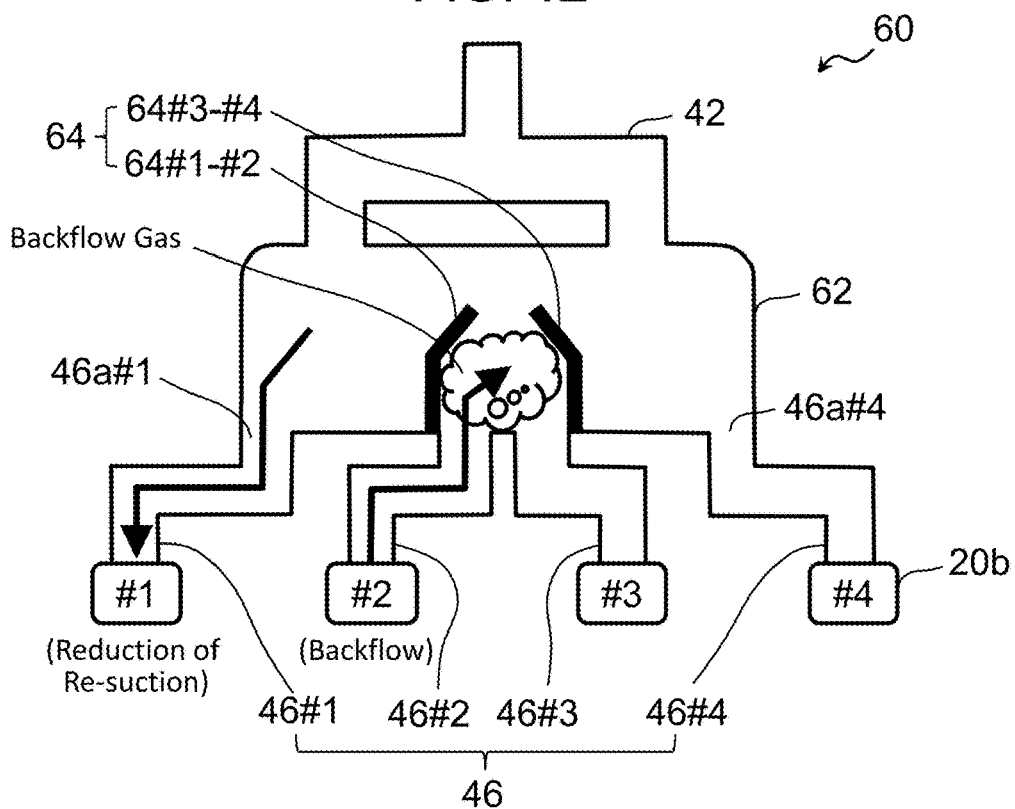
FIG. 12 is a schematic diagram showing a configuration of an EGR passage according to a third embodiment of the present disclosure.

Then, a third embodiment according to the present disclosure will be described with reference to FIG. 12. FIG. 12 is a schematic diagram showing a configuration of an EGR passage 60 according to the third embodiment of the present disclosure. The EGR passage 60 included in an EGR device according to the present embodiment is different from the EGR passage 32 according to the first embodiment in that an EGR chamber 62 is provided in place of the EGR chamber 44. Also, the EGR passage 60 is different from the EGR passage 50 according to the second embodiment in the content of the measures for the additional issue D described in the second embodiment.

Specifically, as shown in FIG. 12, guide plates 64 (more specifically, two guide plates 64#1-#2 and 64#3-#4) are arranged in the EGR chamber 62 according to the present embodiment. The guide plate 64#1-#2 is formed to guide the backflow gas such that the backflow gas into the EGR chamber 62 from the EGR introduction passage 46#2 of the cylinder (preceding cylinder) #2 with an earlier explosion order among the first cylinder subset #1-#2 flows along a direction away from the inlet 46a#1 of the other EGR introduction passage 46#1. Similarly, the other guide plate 64#3-#4 is formed to guide the backflow gas such that the backflow gas into the EGR chamber 62 from the EGR introduction passage 46#3 of the cylinder (preceding cylinder) #3 with an earlier explosion order among the first cylinder subset #3-#4 flows along a direction away from the inlet 46a#4 of the other EGR introduction passage 46#4. These guide plates 64#1-#2 and 64#3-#4 correspond to an example of the "guide portion" according to the present disclosure. The guide plate 64 may be integrally formed with the EGR chamber 62, or the guide plate 64 separate from the EGR chamber 62 may be fixed to the EGR chamber 62.

According to the EGR passage 60 including the EGR chamber 62 having the guide plate 64#1-#2 described above, as illustrated in FIG. 12, the backflow gas from one EGR introduction passage 46#2 of the first cylinder subset #1-#2 can be moved by using the guide plate 64#1-#2 so as to flow along a direction away from the inlet 46a#1 of the other EGR introduction passage 46#1. This makes it possible to reduce the re-suction of the backflow gas into the adjacent cylinder #1, and thus to reduce the volume A necessary for reducing the re-suction. This also applies to the other first cylinder subset #3-#4, and the volume C necessary for reducing the re-suction can be reduced. Also, other effects similar to the second embodiment can be obtained.

As described so far, even in the EGR device including the EGR passage 60 according to the third embodiment, the additional issue D can be addressed together with the issue A1 and the issue B.

In addition, in order to address the additional issue D, the measure of the second embodiment using the shape of the EGR introduction passages 54 may be combined with the measure of the present embodiment using the guide plate 64.

4. Fourth Embodiment

Then, a fourth embodiment according to the present disclosure will be described with reference to FIG. 13. FIG.

13 is a schematic diagram showing a configuration of an EGR passage 70 according to the fourth embodiment of the present disclosure. The EGR passage 70 included in an EGR device according to the present embodiment is different from the EGR passage 60 according to the third embodiment in that an EGR chamber 72 is provided in place of the EGR chamber 62.

In the third embodiment described above, the guide plate 64 disposed in the EGR chamber 62 is used as a measure for the additional issue D. In contrast, in the EGR chamber 72 according to the present embodiment, in order to control the flow direction of the backflow gas as a measure for the additional issue D, the shape of a passage wall surface in the EGR chamber 72 is used.

Figure 13:
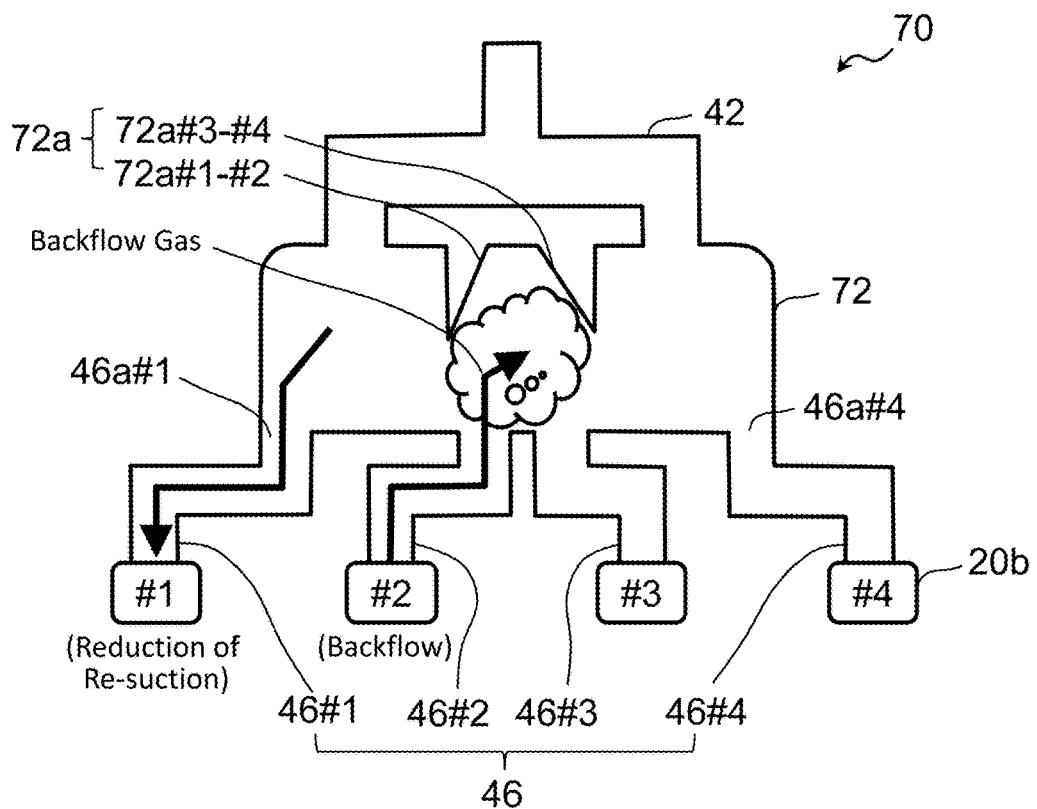
FIG. 13 is a schematic diagram showing a configuration of an EGR passage according to a fourth embodiment of the present disclosure.

Specifically, as shown in FIG. 13, the passage wall of the EGR chamber 72 according to the present embodiment includes a guide wall 72a (more specifically, two guide walls 72a#1-#2 and 72a#3-#4). As an example, the guide wall 72a is provided on the passage wall of the side facing the EGR introduction passages 46. The guide wall 72a#1-#2 is formed to guide the backflow gas such that the backflow gas into the EGR chamber 72 from the EGR introduction passage 46#2 of the cylinder (preceding cylinder) #2 with an earlier explosion order among the first cylinder subset #1-#2 flows along a direction away from the inlet 46a#1 of the other EGR introduction passage 46#1. Similarly, the other guide wall 72a#3-#4 is formed to guide the backflow gas such that the backflow gas into the EGR chamber 72 from the EGR introduction passage 46#3 of the cylinder (preceding cylinder) #3 with an earlier explosion order among the first cylinder subset #3-#4 flows along a direction away from the inlet 46a#4 of the other EGR introduction passage 46#4. These guide walls 72a#1-#2 and 72a#3-#4 correspond to another example of the "guide portion" according to the present disclosure.

According to the EGR passage 70 including the EGR chamber 72 having the guide wall 72a#1-#2 described above, as illustrated in FIG. 13, the backflow gas from one EGR introduction passage 46#2 of the first cylinder subset #1-#2 can also be moved by using the guide wall 72a#1-#2 so as to flow along a direction away from the inlet 46a#1 of the other EGR introduction passage 46#1. This makes it possible to reduce the re-suction of the backflow gas into the adjacent cylinder #1, and thus to reduce the volume A necessary for reducing the re-suction. This also applies to the other first cylinder subset #3-#4, and the volume C necessary for reducing the re-suction can be reduced. Also, other effects similar to the third embodiment can be obtained.

As described so far, even in the EGR device including the EGR passage 70 according to the fourth embodiment, the additional issue D can be addressed together with the issue A1 and the issue B.

In addition, in order to address the additional issue D, at least one of the measure of the second embodiment using the shape of the EGR introduction passages 54 and the measure of the third embodiment using the guide plate 64 may be combined with the measure of the present embodiment using the guide wall 72a.

5. Fifth Embodiment

Figure 14:
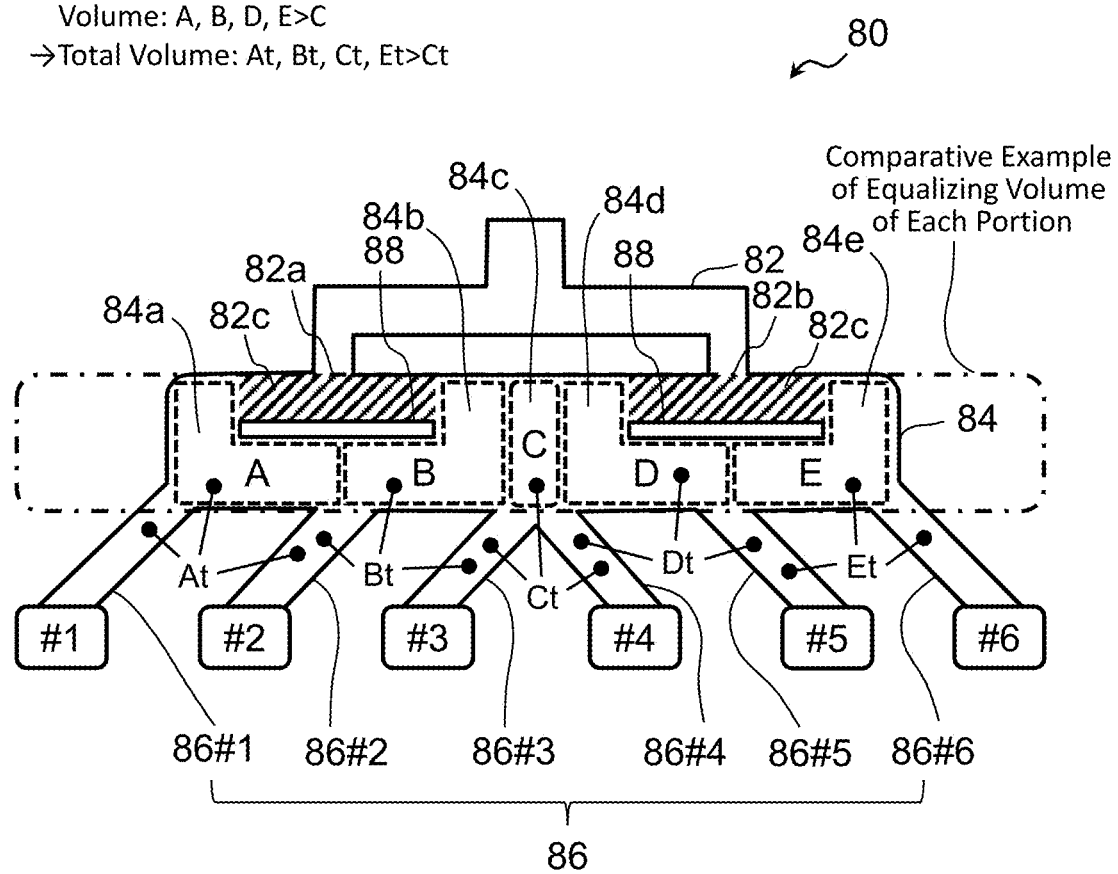
FIG. 14 is a schematic diagram showing a specific configuration of an EGR chamber and EGR introduction passages included in an EGR device according to the a fifth embodiment of the present disclosure.

Then, a fifth embodiment according to the present disclosure will be described with reference to FIG. 14. FIG. 14 is a schematic diagram showing a specific configuration of an EGR chamber 84 and EGR introduction passages 86 included in an EGR device according to the fifth embodiment of the present disclosure. The EGR device according to the present embodiment is mounted on an in-line six-cylinder type internal combustion engine having six cylinders #1 to #6 arranged in series (which corresponds to another example of the "plurality of cylinders" according to the present disclosure). The EGR device includes an EGR passage 80, together with the EGR cooler 34 and the EGR valve 36 (both not shown). The EGR passage 80 includes an upstream-side branch passage 82, the EGR chamber 84 and six EGR introduction passages 86, together with the upstream-side collecting passage 40 (not shown).

Cylinder subsets #1-#2, #2-#3, #3-#4, #4-#5, and #5-#6 correspond to pairs of two cylinders that are positioned next to each other in the in-line six-cylinder internal combustion engine.

The EGR chamber 84 has chamber portions 84a to 84e as portions between cylinders. The chamber portions 84a, 84b, 84c, 84d, and 84e are associated with the cylinder subset #1-#2, the cylinder subset #2-#3, the cylinder subset #3-#4, the cylinder subset #4-#5, and the cylinder subset #5-#6, respectively. It should be noted that, in the EGR chamber 84, a partition wall 88 is provided on each of the cylinders #1 to #3 side and the cylinders #4 to #6 side. The partition walls 88 are respectively arranged to make uniform the passage length from a branch point 82a of the upstream-side branch passage 82 to the inlet of each EGR introduction passage 86 on the cylinders #1 to #3 side, and the passage length from a branch point 82b to the inlet of each EGR introduction passage 86 on the cylinders #4 to #6 side. The EGR gas flows along the partition walls 88 and then finally branches toward each cylinders #1 to #6. For this reason, a hatched portion 82c around each partition wall 88 is herein treated as a part of the upstream-side branch passage 82.

An example of the order of explosions of the internal combustion engine on which the EGR device according to the present embodiment is mounted is #1→#5→#3→#6→#2→#4, which is typical of an in-line six-cylinder engine. The explosion orders are not adjacent between the constituent cylinders of any of the five cylinder subsets described above. The subsets with the shortest explosion interval between the two cylinders constituting each of these five cylinder subsets are four cylinder subsets #1-#2, #2-#3, #4-#5, and #5-#6. More specifically, in the cylinder subset #1-#2, when viewed from the cylinder #2 as a reference, the explosion order of the cylinder #1 is two cylinders after the cylinder #2. This also applies to the other three cylinder subsets #2-#3, #4-#5, and #5-#6.

On the other hand, in the remaining cylinder subset #3-#4, the cylinders #3 and #4 are separated from each other by three cylinders in the explosion order. That is, the explosion interval between the two cylinders #3 and #4 constituting this cylinder subset #3-#4 is longer than those of the remaining four cylinder subsets #1-#2, #2-#3, #4-#5, and #5-#6. Therefore, in the example of the internal combustion engine according to the present embodiment, the cylinder subsets #1-#2, #2-#3, #4-#5, and #5-#6 correspond to an example of the "first cylinder subset" according to the present disclosure, and the cylinder subset #3-#4 corresponds to an example of the "second cylinder subset" according to the present disclosure.

Accordingly, in the EGR passage 80 according to the present embodiment, as shown in FIG. 14, the EGR chamber 84 is formed such that the volumes A, B, C, and E of the chamber portions 84a, 84b, 84d, and 84e respectively associated with the four cylinder subsets #1-#2, #2-#3, #4-#5, and #5-#6 that each correspond to "the first cylinder subset with a relatively short explosion interval between the constituent cylinders" are larger than the volume C of the chamber portion 84c associated with the second cylinder subset #3-#4 with a relatively long explosion interval between the constituent cylinders.

Moreover, the six EGR introduction passages 86 are formed such that their volumes are equal to each other. For this reason, with the above described setting of the volumes A to E of the chamber portions 84a to 84e, volume differences similar to the difference between the volumes A to E are set between the cylinder subsets with respect to the total volumes At to Et including the volumes of the EGR introduction passages 86. As a result, as shown in FIG. 14, the volume of the entire EGR chamber 84 can be reduced as compared with a comparative example (see one-dot chain line) in which the volumes A to E are evenly secured.

Moreover, in view of the additional issue D (see the second embodiment), in the example of the EGR passage 80 shown in FIG. 14, the shapes of the EGR introduction passages 86#2, 86#3, 86#4, and 86#5 of the cylinders (preceding cylinders) #2, #3, #4, and #5 with an earlier explosion order in each of the first cylinder subsets #1-#2, #2-#3, #4-#5, and #5-#6 are set as follows in the same manner as in the second embodiment. That is, the EGR introduction passage 86#2 is formed such that the backflow gas from the EGR introduction passage 86#2 into the EGR chamber 84 flows along a direction away from the inlet of the other EGR introduction passage 86#1 in the first cylinder subset #1-#2. The remaining EGR introduction passages 86#3, 86#4, and 86#5 are also formed in the same manner. It should be noted that, as an example, the remaining EGR introduction passages 86#1 and 86#6 are formed in the same manner as the other EGR introduction passages 86 in order to make the passage length (passage volume) uniform.

Furthermore, in view of the issue A2, in the EGR passage 80, the passage pressure loss between the cylinders is equalized by the method described in the first embodiment (see FIG. 7A).

By providing the configuration described so far, even in the EGR device mounted on the in-line six-cylinder internal combustion engine, both the issue A1 and the issue B can be addressed similarly to the first embodiment,. That is, the distribution of EGR gas to the individual cylinders #1 to #6 can be improved while reducing an increase in size of the EGR chamber 84 and the EGR introduction passages 86. Furthermore, the additional issue D and the issue A2 can also be addressed together with these issues A1 and B.

In addition, in order to address the additional issue D, measures using at least one of a guide plate and a guide wall as in the third and fourth embodiments may be taken instead of or in addition to the measure using the shape (orientation) of the EGR introduction passages 86 shown in FIG. 14.

6. Sixth Embodiment

Then, a sixth embodiment according to the present disclosure and modification examples thereof will be described with reference to FIGS. 15 and 16.

6-1. Specific Configuration of EGR Chamber and EGR Introduction Passages

Figure 15:
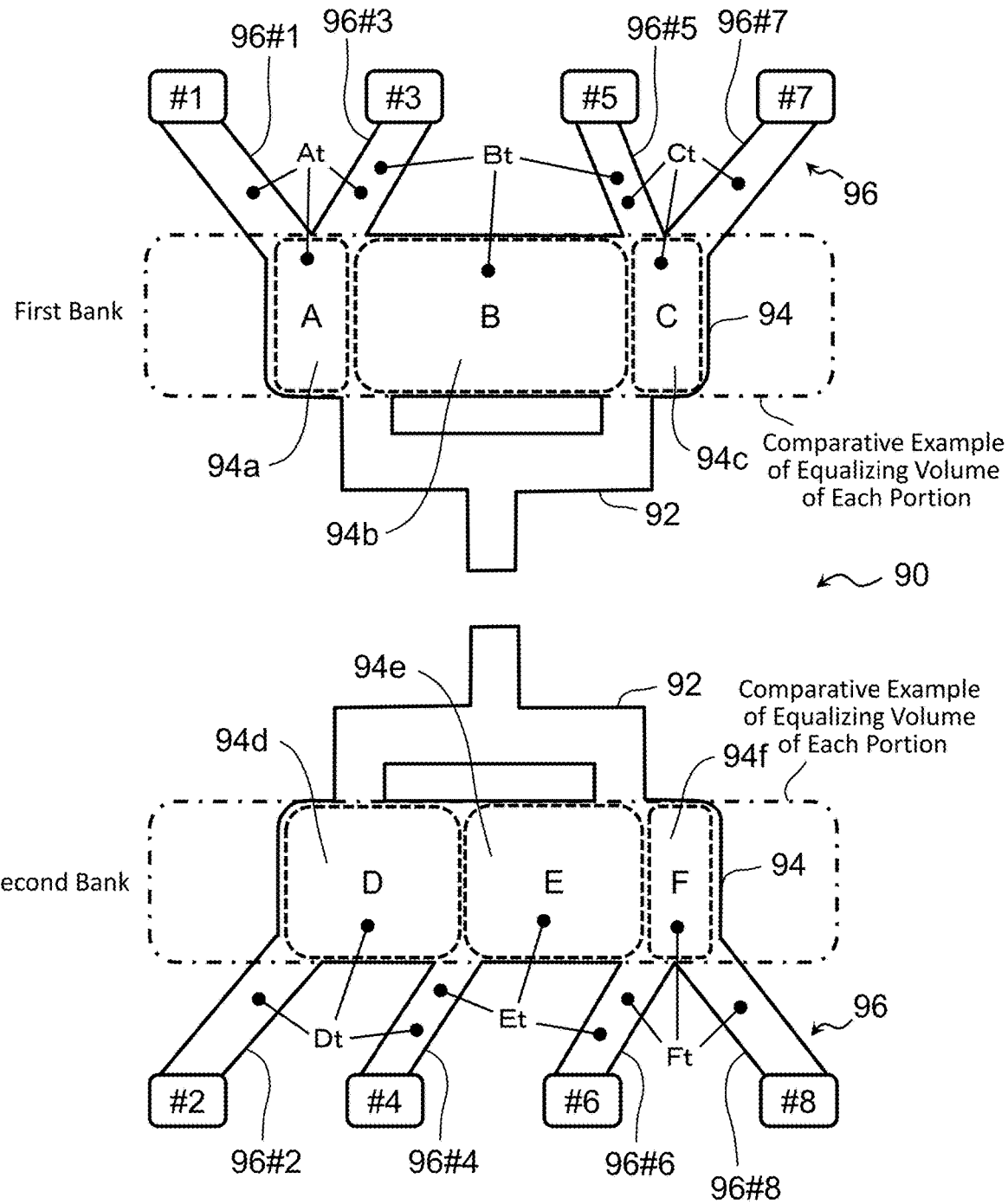
FIG. 15 is a schematic diagram showing a specific configuration of an EGR chamber and EGR introduction passages included in an EGR device according to a sixth embodiment of the present disclosure.

FIG. 15 is a schematic diagram showing a specific configuration of an EGR chamber 94 and EGR introduction passages 96 included in an EGR device according to the sixth embodiment of the present disclosure. The EGR device according to the present embodiment is mounted on a V-type eight-cylinder internal combustion engine. As shown in FIG. 15, this internal combustion engine has a first bank (first cylinder group) having four cylinders #1, #3, #5, and #7 arranged in series (which corresponds to still another example of the "plurality of cylinders" according to the present disclosure), and a second bank (second cylinder group) having four cylinders #2, #4, #6, and #8 arranged in series (which corresponds to yet another example of the "plurality of cylinders" according to the present disclosure).

The EGR device according to the present embodiment includes an EGR passage 90. The EGR passage 90 has an upstream-side branch passage 92, an EGR chamber 94, and four EGR introduction passages 96 for each bank. An upstream-side collecting passage (not shown) located upstream of the upstream-side branch passage 92 of each bank may be independent for each bank, or may be shared between the banks and branched to the first and second banks on the way. It should be noted that the EGR valve and the EGR cooler may be independent for each bank, or may be shared between the banks.

In the V-type eight-cylinder internal combustion engine, cylinder subsets #1-#2, #3-#5, and #5-#7 correspond to pairs of two cylinders that are positioned next to each other in the first bank, and cylinder subsets #2-#4, #4-#6, and #6-#8 correspond to pair of the two cylinders that are positioned next to each other in the second bank.

The EGR chamber 94 of the first bank has chamber portions 94a to 94c as portions between cylinders. The chamber portions 94a, 94b, and 94c are associated with the cylinder subset #1-#3, the cylinder subset #3-#5, and the cylinder subset #5-#7, respectively. Similarly, chamber portions 94d, 94e, and 94f of the EGR chamber 94 of the second bank are associated with the cylinder subset #2-#4, the cylinder subset #4-#6, and the cylinder subset #6-#8, respectively.

An example of the order of explosions of the internal combustion engine on which the EGR device according to the present embodiment is mounted is #1→#8→#7→#3→#6→#5→#4→#2, which is typical of a V-type eight-cylinder engine.

6-1-1. First Bank

First, the configuration of the first bank will be described. The explosion orders are not adjacent between the constituent cylinders of any of the three cylinder subsets #1-#3, #3-#5, and #5-#7 described above. The subset with the shortest explosion interval between the two cylinders constituting each of these three cylinder subsets is the cylinder subset #3-#5. More specifically, in the cylinder subset #3-#5, when viewed from the cylinder #3 as a reference, the explosion order of the cylinder #5 is two cylinders after the cylinder #3.

In the cylinder subset #1-#3, when viewed from the cylinder #1 as a reference, the explosion order of the cylinder #3 is three cylinders after the cylinder #1. Similarly, in the cylinder subset #5-#7, the explosion order of the cylinder #5 is three cylinders after the cylinder #7. That is, the explosion interval between the constituent cylinders of each of these cylinder subsets #1-#3 and #5-#7 is longer than that of the cylinder subset #3-#5 described above. Therefore, in the example of the internal combustion engine according to the present embodiment, the cylinder subset #3-#5 corresponds to an example of the "first cylinder subset" according to the present disclosure, and the cylinder subsets #1-#3 and #5-#7 correspond to an example of the "second cylinder subset" according to the present disclosure.

Accordingly, in the EGR passage 90 according to the present embodiment, as shown in FIG. 15, the EGR chamber 94 of the first bank is formed such that the volume B of the chamber portion 94b associated with the first cylinder subset #3-#5 is larger than the volumes A and C of the chamber portions 94a and 94c respectively associated with the two second cylinder subsets #1-#3 and #5-#7.

Moreover, the four EGR introduction passages 96 of the first bank are formed such that their volumes are equal to each other. For this reason, with the above described setting of the volumes A to C of the chamber portions 94a to 94c, volume differences similar to the difference between the volumes A to C are set between the cylinder subsets with respect to the total volumes At to Ct including the volumes of the EGR introduction passages 96. As a result, as shown in FIG. 15, the volume of the entire EGR chamber 94 can be reduced as compared with a comparative example (see one-dot chain line) in which the volumes A to C are evenly secured.

6-1-2. Second Bank

Then, the configuration of the second bank will be described. In the cylinder subset #2-#4 among the above described three cylinder subsets #2-#4, #4-#6, and #6-#8, the explosion orders are adjacent between the constituent cylinders. In the cylinder subset #4-#6, when viewed from the cylinder #6 as a reference, the explosion order of the cylinder #4 is two cylinders after the cylinder #6. In the remaining cylinder subset #6-#8, when viewed from the cylinder #8 as a reference, the explosion order of the cylinder #6 is three cylinders after the cylinder #8.

That is, in the second bank, the explosion interval between the constituent cylinders is the shortest in the cylinder subset #2-#4, followed by the cylinder subsets #4-#6 and #6-#8 in this order. In the present embodiment, as an example, the cylinder subset #6-#8 with the longest explosion order between the constituent cylinders is treated as the "second cylinder subset", and the cylinder subsets #2-#4 and #4-#6 with relatively short explosion intervals are treated as the "first cylinder subset".

Accordingly, in the EGR passage 90 according to the present embodiment, the EGR chamber 94 of the second bank is formed such that, as shown in FIG. 15, the volumes D and E of the chamber portions 94d and 94e respectively associated with the two first cylinder subsets #2-#4 and #4-#6 is larger than the volume F of the chamber portion 94f associated with the second cylinder subset #6-#8.

Moreover, the four EGR introduction passages 96 of the second bank are formed such that their volumes are equal to each other. For this reason, with the setting of the volumes D to F of the chamber portions 94d to 94f described above, volume differences similar to the difference between the volumes D to F are set between the cylinder subsets with respect to the total volumes Dt to Ft including the volumes of the EGR introduction passages 96. As a result, as shown in FIG. 15, the volume of the entire EGR chamber 94 can be reduced as compared with a comparative example (see one-dot chain line) in which the volumes D to F are evenly secured.

6-1-3. Measures for Additional Issue D and Issue A2

Moreover, in view of the additional issue D (see the second embodiment), in the example of the EGR passage 90 shown in FIG. 15, the shapes of the EGR introduction passages 96#3, 96#4, and 96#6 of the cylinders (preceding cylinders) #3, #4, and #6 with an earlier explosion order in each of the first cylinder subsets #3-#5, #2-#4, and #4-#6 are set as follows in the same manner as in the second embodiment. That is, the EGR introduction passage 96#3 is formed such that the backflow gas from the EGR introduction passage 96#3 into the EGR chamber 94 flows along a direction away from the inlet of the other EGR introduction passage 96#5 in the first cylinder subset #3-#5. The remaining EGR introduction passages 96#4, and 96#6 are also formed in the same manner. It should be noted that the EGR introduction passage 96#5 is formed in the same manner as the other EGR introduction passages 96 in order to provide a difference between the volume B and the volume C while making the passage length (passage volume) uniform. The remaining EGR introduction passages 96#1, 96#2, 96#7, and 96#8 are formed in the same manner as the other EGR introduction passages 96 in order to make the passage length (passage volume) uniform.

Furthermore, in view of the issue A2, in the EGR passage 90, the passage pressure loss between the cylinders is equalized by the method described in the first embodiment (see FIG. 7A).

6-2. Effect

By providing the configuration described so far, even in the EGR device mounted on the V-type eight-cylinder internal combustion engine, both the issue A1 and the issue B can be addressed similarly to the first embodiment. That is, the distribution of EGR gas to the plurality of cylinders arranged in series in each bank can be improved while reducing an increase in size of the EGR chamber 94 and the EGR introduction passages 96. Furthermore, the additional issue D and the issue A2 can also be addressed together with these issues A1 and B.

6-3. Modification Examples 6-3-1. Another Example of Measures to Address Additional Issue D In order to address the additional issue D, measures using at least one of a guide plate and a guide wall as in the third and fourth embodiments may be taken instead of or in addition to the measure using the shape (orientation) of the EGR introduction passages 96 shown in FIG. 15.

6-3-2. Another Setting Example of Volume Difference

Figure 16:
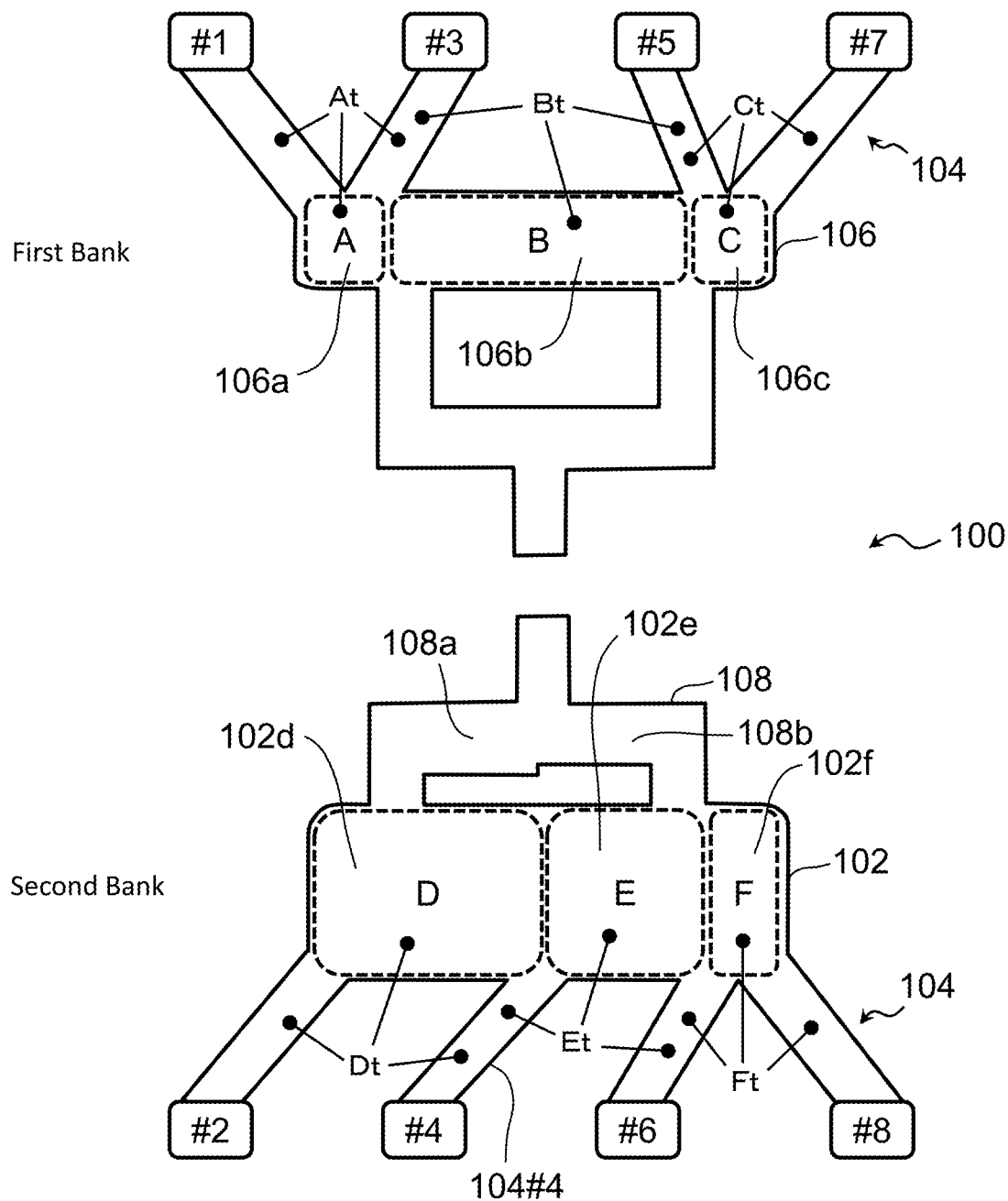
FIG. 16 is a schematic diagram showing a specific configuration of an EGR passage included in an EGR device according to a modification example of the sixth embodiment of the present disclosure.

FIG. 16 is a schematic diagram showing a specific configuration of an EGR passage 100 included in an EGR device according to a modification example of the sixth embodiment of the present disclosure. In the sixth embodiment described above, in each of the first and second banks, the volume difference in the EGR chamber 94 is given in two stages. Here, if the explosion order described in the six embodiment is used, the explosion interval between the constituent cylinders in each of the cylinder subsets for the plurality of cylinders (cylinders #2, #4, #6, and #8) "on the second bank side" changes in three stages. Therefore, in the example shown in FIG. 16, as described below, the difference in the volumes D to F of the respective portions of an EGR chamber 102 of the second bank is given in three stages.

In the second bank of the example shown in FIG. 16, whether a cylinder subset corresponds to the first cylinder subset or the second cylinder subset differs depending on the selection of two cylinder subsets to be compared. Specifically, in comparison between the cylinder subset #2-#4 and the cylinder subset #4-#6, the cylinder subset #4-#6 in which the explosion interval between the constituent cylinders is relatively long corresponds to the "second cylinder subset", and the cylinder subset #2-#4 corresponds to the "first cylinder subset". On the other hand, in comparison between the cylinder subset #4-#6 and the cylinder subset #6-#8, the cylinder subset #4-#6 whose explosion interval is relatively short corresponds to the "first cylinder subset", and the cylinder subset #6-#8 corresponds to the "second cylinder subset".

Accordingly, as shown in FIG. 16, the EGR chamber 102 of the second bank is configured such that, of the volumes D, E, and F of the chamber portions 102d, 102e, and 102f respectively associated with the three cylinder subsets

2-#4, #4-#6, and #6-#8, the volume D is the largest, the volume E is the second largest, and the volume F is the smallest. Then, similarly to the sixth embodiment, with the setting of the volumes D to F of the chamber portions 102d to 102f described above, volume differences similar to the difference between the volumes D to F are set between the cylinder subsets with respect to the total volumes Dt to Ft including the volumes of EGR introduction passages 104.

On the other hand, the magnitude relationship between the volumes A, B, and C of chamber portions 106a, 106b, and 106c of an EGR chamber 106 on the first bank side is the same as that of the sixth embodiment. Then, in the example shown in FIG. 16, when two banks are viewed together, the volume difference is set such that the volume D is the largest, the volumes B and E are the second largest, and the remaining volumes A, C, and F are the smallest. Furthermore, in order to form this volume difference, as an example, the volume of the entire EGR chamber 106 of the first bank is adjusted to be smaller than the volume of the EGR chamber 102 of the second bank.

According to the example shown in FIG. 16 described above, when compared with the sixth embodiment shown in FIG. 15, it is possible to more effectively improve the cylinder distribution of EGR gas by reducing interference between cylinders (re-suction of backflow gas) while making smaller the overall volume of the EGR chambers 102 and 106 in both banks.

In addition, as a result of providing the difference between the volume D and the volume E as shown in FIG. 16, the passage length of the EGR introduction passage 104#4 of the cylinder #4 is longer than that of the EGR introduction passage 96#4 of the cylinder #4 in the example shown in FIG. 15. This causes a difference in passage pressure loss between cylinders. In view of this point (issue A2), in the example shown in FIG. 16, the passage diameter of a portion 108a on the cylinders #2 and #4 side in an upper-side branch passage 108 of the second bank are made greater than the passage diameter of a portion 108b on the cylinders #6 and #8 side. As a result, the difference in passage pressure loss between the cylinders #2 and #4 side and the cylinders #6 and #8 side can be reduced while changing the passage length of the EGR introduction passage 104#4 as described above.

7. Seventh Embodiment

A seventh embodiment according to the present disclosure and modification examples thereof will be described with reference to FIGS. 17 and 18.

7-1. Specific Configuration of EGR Chamber and EGR Introduction Passages

Figure 17:
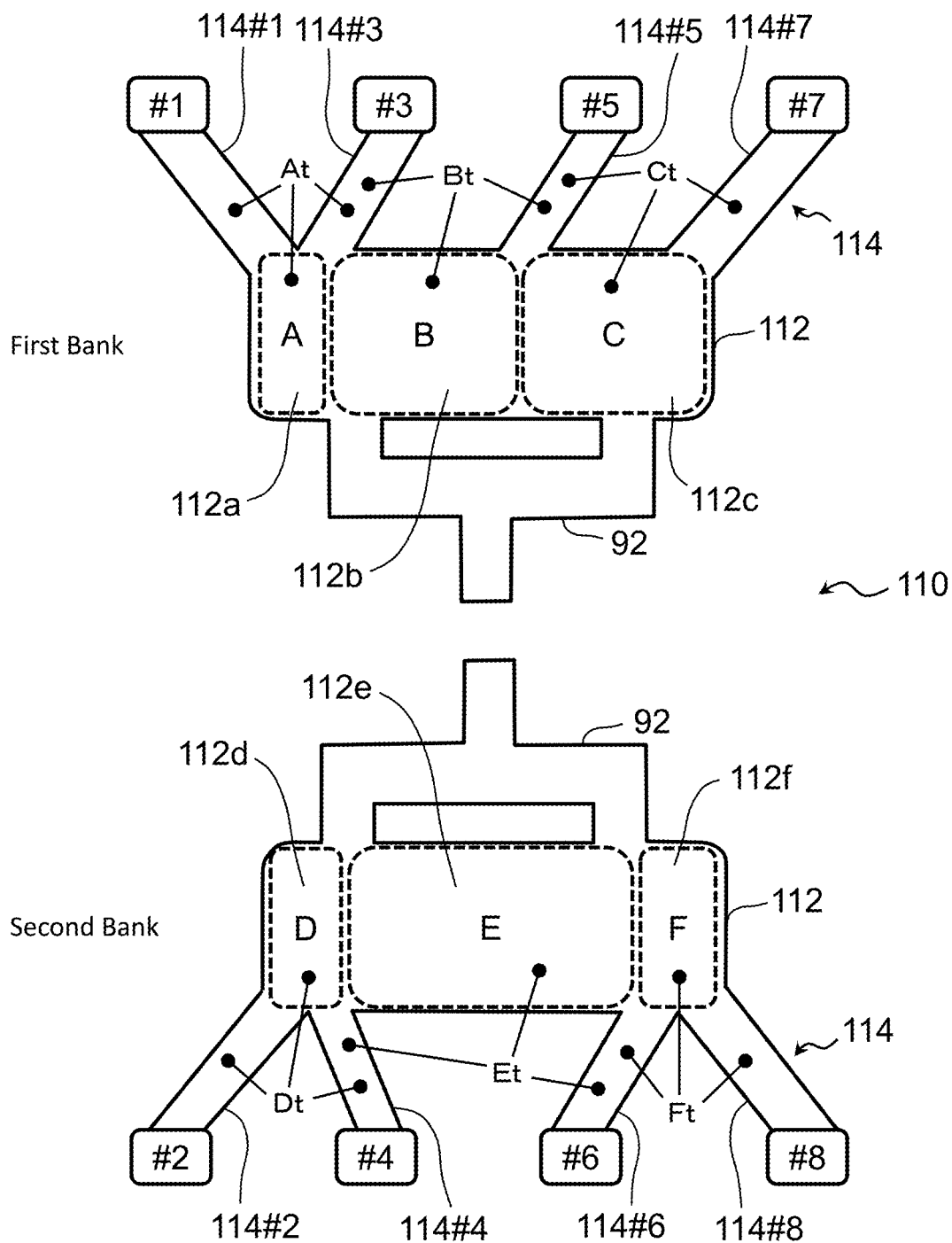
FIG. 17 is a schematic diagram showing a specific configuration of an EGR chamber and EGR introduction passages included in an EGR device according to a seventh embodiment of the present disclosure.

FIG. 17 is a schematic diagram showing a specific configuration of an EGR chamber 112 and EGR introduction passages 114 included in an EGR device according to the seventh embodiment of the present disclosure. The EGR device according to the present embodiment is mounted on a V-type eight-cylinder internal combustion engine in the same manner as in the sixth embodiment. The present EGR device includes an EGR passage 110. The EGR passage 110 is configured in the same manner as the EGR passage 90 according to the sixth embodiment except for the points described below.

The EGR passage 110 includes, for each bank, an EGR chamber 112 and four EGR introduction passages 114 together with the upstream-side branch passage 92. Chamber portions 112a, 112b, and 112c of the EGR chamber 112 of the first bank are associated with the cylinder subset #1-#3, the cylinder subset #3-#5, and the cylinder subset #5-#7, respectively. Similarly, chamber portions 112d, 112e, and 112f of the EGR chamber 112 of the second bank are associated with the cylinder subset #2-#4, the cylinder subset #4-#6, and the cylinder subset #6-#8, respectively.

The internal combustion engine according to the present embodiment is different from the internal combustion engine according to the sixth embodiment in the explosion order. An example of the explosion order used in the present embodiment is #1→#8→#4→#3→#6→#5→#7→#2, which is another typical order in a V-type eight-cylinder engine.

7-1-1. First Bank

First, the configuration of the first bank will be described. In the cylinder subset #5-#7 among the above described three cylinder subsets #1-#3, #3-#5, and #5-#7, the explosion orders are adjacent between the constituent cylinders. In the cylinder subset #3-#5, when viewed from the cylinder #3 as a reference, the explosion order of the cylinder #5 is two cylinders after the cylinder #3. In the remaining cylinder subset #1-#3, when viewed from the cylinder #1 as a reference, the explosion order of the cylinder #3 is three cylinders after the cylinder #1.

That is, in the first bank, the explosion interval between the constituent cylinders is the shortest in the cylinder subset #5-#7, followed by the cylinder subsets #3-#5 and #1-#3 in this order. In the present embodiment, as an example, the cylinder subset #1-#3 with the longest explosion order between the constituent cylinders is treated as the "second cylinder subset", and the cylinder subsets #3-#5 and #5-#7 with relatively short explosion intervals are treated as the "first cylinder subset".

Accordingly, in the EGR passage 110 according to the present embodiment, the EGR chamber 112 of the first bank is formed such that, as shown in FIG. 17, the volumes B and C of the chamber portions 112b and 112c respectively associated with the two first cylinder subsets #3-#5 and #5-#7 is larger than the volume A of the chamber portion 112a associated with the second cylinder subset #1-#3. Also, similarly to the six embodiment, with the setting of the volumes A to C of the chamber portions 112a to 112c described above, volume differences similar to the difference between the volumes A to C are set between the cylinder subsets with respect to the total volumes At to Ct including the volumes of the EGR introduction passages 114.

7-1-2. Second Bank

Then, the configuration of the second bank will be described. The explosion orders are not adjacent between the constituent cylinders of any of the three cylinder subsets #2-#4, #4-#6, and #6-#8 described above. In the cylinder subset #4-#6, the explosion order of the cylinder #6 is two cylinders after the cylinder #4. In the cylinder subset #2-#4, the explosion order of the cylinder #4 is three cylinders after the cylinder #2. Similarly, in the cylinder subset #6-#8, the explosion order of the cylinder #6 is three cylinders after the cylinder #8. Therefore, in the example of the internal combustion engine according to the present embodiment, the cylinder subset #4-#6 corresponds to an example of the "first cylinder subset" according to the present disclosure, and the cylinder subsets #2-#4 and #6-#8 correspond to an example of the "second cylinder subset" according to the present disclosure.

Accordingly, in the EGR passage 110 according to the present embodiment, as shown in FIG. 17, the EGR chamber 112 of the second bank is formed such that the volume E of the chamber portion 112e associated with the first cylinder subset #4-#6 is larger than the volumes D and F of the chamber portions 112d and 112f respectively associated with the two second cylinder subsets #2-#4 and #6-#8. Also, similarly to the six embodiment, with the above described setting of the volumes D to F of the chamber portions 112d to 112f, volume differences similar to the difference between the volumes D to F are set between the cylinder subsets with respect to the total volumes Dt to Ft including the volumes of the EGR introduction passages 114.

7-1-3. Measures for Additional Issue D and Issue A2

Moreover, in view of the additional issue D (see the second embodiment), in the example of the EGR passage 110 shown in FIG. 17, the shapes of the EGR introduction passages 114#3, 114#5, and 114#4 of the cylinders (preceding cylinders) #3, #5, and #4 with an earlier explosion order in each of the first cylinder subsets #3-#5, #5-#7, and #4-#6 are set as follows in the same manner as in the second embodiment. That is, the EGR introduction passage 114#3 is formed such that the backflow gas from the EGR introduction passage 114#3 into the EGR chamber 112 flows along a direction away from the inlet of the other EGR introduction passage 114#5 in the first cylinder subset #3-#5. The remaining EGR introduction passages 114#5, and 114#4 are also formed in the same manner.

Furthermore, in view of the issue A2, in the EGR passage 110, the passage pressure loss between the cylinders is equalized by the method described in the first embodiment (see FIG. 7A).

7-2. Effect

By providing the configuration described so far, even in the EGR device mounted on the V-type eight-cylinder internal combustion engine that adopts the explosion order of the present embodiment, both the issue A1 and the issue B can be addressed similarly to the first embodiment. That is, the distribution of EGR gas to the plurality of cylinders arranged in series in each bank can be improved while reducing an increase in size of the EGR chamber 112 and the EGR introduction passages 114. Furthermore, the additional issue D and the issue A2 can also be addressed together with these issues A1 and B.

7-3. Modification Examples 7-3-1. Another Example of Measures to Address Additional Issue D In order to address the additional issue D, measures using at least one of a guide plate and a guide wall as in the third and fourth embodiments may be taken instead of or in addition to the measure using the shape (orientation) of the EGR introduction passages 114 shown in FIG. 17.

7-3-2. Another Setting Example of Volume Difference

Figure 18:
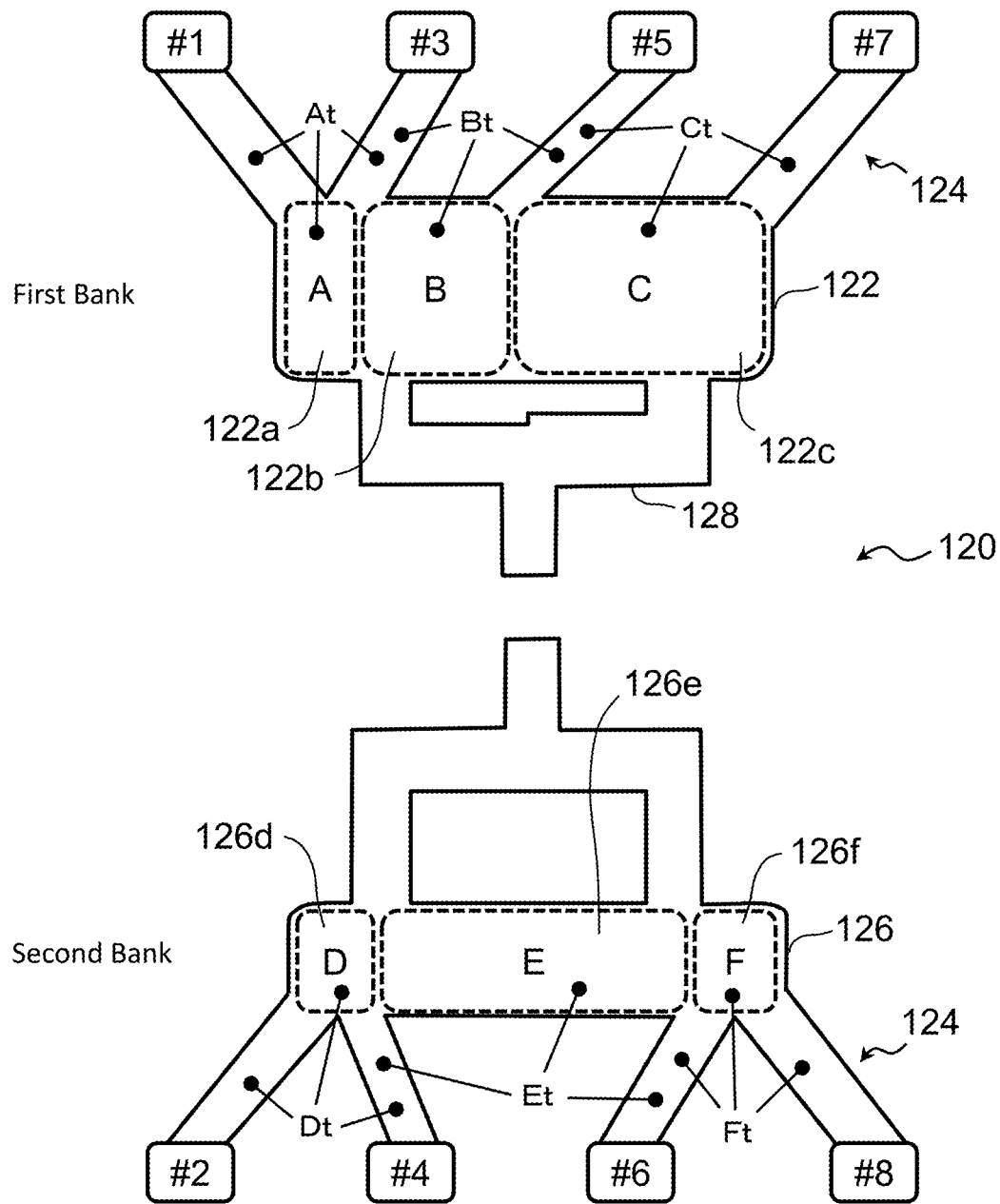
FIG. 18 is a schematic diagram showing a specific configuration of an EGR passage included in an EGR device according to a modification example of the seventh embodiment of the present disclosure.

FIG. 18 is a schematic diagram showing a specific configuration of an EGR passage 120 included in an EGR device according to a modification example of the seventh embodiment of the present disclosure. The positioning of FIG. 18 with respect to FIG. 17 (seventh embodiment) is the same as the positioning of FIG. 16 with respect to FIG. 15 (six embodiment).

If the explosion order described in the seventh embodiment is used, the explosion interval between the constituent cylinders in each of the cylinder subsets for the plurality of cylinders (cylinders #1, #3, #5, and #7) "on the first bank side" changes in three stages. Therefore, in the example shown in FIG. 18, based on the same idea as the example shown in FIG. 16, the difference in the volumes A to C of the respective portions of an EGR chamber 122 of the first bank is given in three stages as follows.

That is, as shown in FIG. 18, the EGR chamber 122 according to the first bank is formed such that the volume C of a chamber portion 122c associated with the cylinders #5 and #7 with the shortest explosion interval is the largest, the volume B of a chamber portion 122b associated with the cylinders #3 and #5 with the second shortest explosion interval is the second largest, and the volume A of a chamber portion 122a associated with the cylinders #1 and #3 with the longest explosion interval is the smallest. Then, similarly to the seventh embodiment, with the setting of the volumes A to C of the chamber portions 122a to 122c described above, volume differences similar to the difference between the volumes A to C are set between the cylinder subsets with respect to the total volumes At to Ct including the volumes of EGR introduction passages 124.

The magnitude relationship between the volumes D, E, and F of chamber portions 126d, 126e, and 126f of an EGR chamber 126 on the second bank side is the same as that of the seventh embodiment. Then, in the example shown in FIG. 18, when two banks are viewed together, the volume difference is set such that the volume C is the largest, the volumes B and E are the second largest, and the remaining volumes A, D, and F are the smallest. Moreover, in order to form this volume difference, as an example, the volume of the entire EGR chamber 126 of the second bank is adjusted to be smaller than the volume of the EGR chamber 122 of the first bank. Furthermore, in order to reduce the difference between cylinders in passage pressure loss caused by providing the difference between the volume B and the volume C, the passage diameter of an upstream-side branch passage 128 of the first bank is adjusted by the same method as in the example shown in FIG. 16 (i.e., the modification example of the sixth embodiment).

It should be noted that the setting of the volume difference between the "first total volume" and the "second total volume" by the EGR passage according to the present disclosure can also be appropriately applied to an internal combustion engine in which at least one of the explosion order, the number of cylinders, and the cylinder arrangement is different from the internal combustion engines exemplified in the first to seventh embodiments, such as the internal combustion engine 10.

The embodiments and modification examples described above may be combined in other ways than those explicitly described above as required and may be modified in various ways without departing from the scope of the present disclosure.

What is claimed is:

1. An EGR device that is applied to an internal combustion engine including a plurality of cylinders arranged in series and a plurality of intake branch passages respectively connected to the plurality of cylinders, and is configured to recirculate a part of exhaust gas to the plurality of intake branch passages as EGR gas, the EGR device comprising an EGR passage through which the EGR gas flows, wherein
the EGR passage includes:
   a plurality of EGR introduction passages respectively connected to the plurality of intake branch passages; and
   an EGR chamber connected to the plurality of EGR introduction passages and configured to distribute the EGR gas introduced into the EGR passage to the plurality of EGR introduction passages,
the plurality of cylinders include a first cylinder subset being a pair of two cylinders that are positioned next to each other, and a second cylinder subset being another pair of two cylinders that are positioned next to each other,
when comparing by a length of a shorter explosion interval of two explosion intervals between two cylinders belonging to a same cylinder subset, an explosion interval between the two cylinders constituting the first cylinder subset is shorter than an explosion interval between the two cylinders constituting the second cylinder subset, the plurality of EGR introduction passages include two first EGR introduction passages associated with the first cylinder subset and two second EGR introduction passages associated with the second cylinder subset, and a first total volume being a sum of volumes of the two first EGR introduction passages and a volume of a portion of the EGR chamber located between the two first EGR introduction passages is larger than a second total volume being a sum of volumes of the two second EGR introduction passages and a volume of a portion of the EGR chamber located between the two second EGR introduction passages.

2. The EGR device according to claim 1, wherein
when a cylinder with an earlier explosion order in a shorter explosion interval of two explosion intervals between two cylinders belonging to a same cylinder subset is referred to as a preceding cylinder, one of the two first EGR introduction passages associated with the preceding cylinder belonging to the first cylinder subset is formed such that a backflow gas from the one of the two first EGR introduction passages into the EGR chamber flows along a direction away from an inlet of another of the two first EGR introduction passages.

3. The EGR device according to claim 1, wherein
when a cylinder with an earlier explosion order in a shorter explosion interval of two explosion intervals between two cylinders belonging to a same cylinder subset is referred to as a preceding cylinder, the EGR chamber includes a guide portion configured to guide a backflow gas into the EGR chamber from one of the two first EGR introduction passages associated with the preceding cylinder belonging to the first cylinder subset such that the backflow gas flows along a direction away from an inlet of another of the two first EGR introduction passages.

4. The EGR device according to claim 3, wherein
the guide portion is a guide plate arranged in the EGR chamber.

5. The EGR device according to claim 3, wherein
the guide portion is a guide wall formed by using a shape of a passage wall surface of the EGR chamber.

6. The EGR device according to claim 2, wherein
when a cylinder with an earlier explosion order in a shorter explosion interval of two explosion intervals between two cylinders belonging to a same cylinder subset is referred to as a preceding cylinder, the EGR chamber includes a guide portion configured to guide a backflow gas into the EGR chamber from one of the two first EGR introduction passages associated with the preceding cylinder belonging to the first cylinder subset such that the backflow gas flows along a direction away from an inlet of another of the two first EGR introduction passages.

7. The EGR device according to claim 6, wherein
the guide portion is a guide plate arranged in the EGR chamber.

8. The EGR device according to claim 6, wherein
the guide portion is a guide wall formed by using a shape of a passage wall surface of the EGR chamber.

* * * * *